United States Patent
Jüttner et al.

(10) Patent No.: US 7,020,086 B2
(45) Date of Patent: Mar. 28, 2006

(54) LAGRANGE QUALITY OF SERVICE ROUTING

(75) Inventors: Alpár Jüttner, Veszpém (HU); Ildikó Mécs, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1010 days.

(21) Appl. No.: 09/893,960

(22) Filed: Jun. 29, 2001

(65) Prior Publication Data

US 2002/0045453 A1    Apr. 18, 2002

Related U.S. Application Data

(60) Provisional application No. 60/216,037, filed on Jul. 3, 2000.

(51) Int. Cl.
  *H04J 1/16*      (2006.01)
  *G06F 15/173*   (2006.01)
(52) U.S. Cl. .................. 370/238; 706/19; 709/239; 709/240; 709/241
(58) Field of Classification Search ........ 370/237–238; 709/238–242; 706/19
See application file for complete search history.

(56) References Cited

U.S. PATENT DOCUMENTS 6,411,946 B1 * 6/2002 Chaudhuri .................. 706/21
2002/0097716 A1 * 7/2002 Kumaran et al. ........... 370/389

OTHER PUBLICATIONS

Mehrdad Parsa, An Iterative Algorithm for Delay-Constrained Minimum-Cost Multicasting, Aug. 4, 1998, IEEE, p. 461-474.*

* cited by examiner

*Primary Examiner*—Chi Pham
*Assistant Examiner*—Ronald Abelson
(74) *Attorney, Agent, or Firm*—Roger Burleigh

(57) ABSTRACT

A method for practical QoS routing, which provides a solution to the delay constrained least cost routing problem, is presented. The method uses the concept of aggregated costs and finds the optimal multiplier based on Lagrange relaxation. The method is polynomial in running time, and produces a theoretical lower bound (i.e. optimal solution), along with the result. The differences between the lower bound and result are small, indicating the quality of the result. Additionally, by further relaxing the desire for an optimal solution, an option is provided to control the trade-off between running time of the algorithm and quality of the result.

17 Claims, 16 Drawing Sheets

LAGRANGE QUALITY OF SERVICE ROUTING

The present application claims priority under 35 U.S.C. § 119(e) to U.S. Provisional application No. 60/216,037 filed Jul. 3, 2000, the entire contents of which are herein expressly incorporated by reference.

TECHNICAL FIELD OF THE INVENTION

The present invention is directed to path selection in networks. In particular, the present invention involves selecting a path that meets user defined criteria, through the use of a method that employs a Lagrange relaxation variable.

BACKGROUND

Modern telecommunication networks carry different types of traffic having different Quality of Service (QoS) requirements. QoS requirements can be defined using various parameters for a desired communication path. These parameters include bandwidth, delay, jitter and loss probability, among others. The ability to fulfill QoS requirements depends on the actual path selected in the network for carrying the traffic. Path selection therefore has to consider application dependent QoS requirements associated with the traffic. Without an efficient QoS routing algorithm to select the path that meets the specified QoS requirements, networks may fail to find a path and reject a request for a connection, even though there might be an appropriate path available to successfully establish the connection. In addition to the use of QoS requirements in path selection, the selection of a path with a minimum cost, which is also referred to as "administrative weight," is desirable, for example, to minimize the overall load on the network of the new path.

FIG. 1 is a view of a modem telecommunications environment. In FIG. 1, homes, businesses, schools, government institutions, hospitals, etc., all connect into the telecommunications network, seeking to transfer data, text, graphic images (including scanned images or computer generated graphics), audio (including voice, music, computer generated sounds and other natural sounds (animals, the ocean, a rockslide, etc.)), video, and combinations thereof. Coaxial cable, fiber-optic cable, fiber & coax, twisted copper lines, RF (including line-of-sight (LOS)) transmissions, and satellite transmission systems), and other means of connectivity link these institutions to each other.

FIG. 2 illustrates various nodes, and links between these nodes in an exemplary communication system. The communication system includes nodes S, A, B, C, D, X, Y, Z, and T, and the various links between these nodes. Nodes, in practical applications, are telephone switching stations, routers, receivers and transmitters, or any electronic system capable of receiving a signal in, and transmitting a signal out. Links are the means of connecting the practical electrical nodes; LOS RF transmissions, fiber-optic cables, etc., as discussed above.

A link represents the physical connection between two nodes, with no other node between the two nodes. A path is a set of individual links that moves a signal from its origin, S, to its destination, T (otherwise shown as "S-T"). For example, path p (S-A-Y-T), path q (S-B-Z-T) and path r (S-C-X-T) are composed of different sets of links, yet still represent the path S-T. Each link and node has specifications which describe the ability to pass data through the node or link, and what effect there might be upon the data. For example, there are delays (e.g., queuing and propagation delays), costs (e.g., hop count, monetary cost, or some measure of a link's capacity), and data error rates associated with each node and link. Thus, the goal is to create a set of nodes and links that meets or exceeds the QoS requirements for that path.

As an example of a typical communications network configuration, suppose, in FIG. 2, node S is an individual's home, and a call is being placed across the continental United States. The telephone call emanates from the residential home (node S) as twisted copper wire (link S-B), then is transmitted across the country (from node B) via a satellite transmission system (link B-Y). At the receiving end (node Y), the call is converted back from RF to twisted pair (link Y-T), which is the medium that enters the recipient's home or place of business (node T). It will be recognized and appreciated by those skilled in the art, that a separate line which emanates from S might be a CATV coax line (link S-A), or fiber optic line (link S-C). Depending on the application, the individual at node S could have a choice of which link to route a signal. Then, a QoS requirement might be established which is path dependent.

It will be recognized that although the number of variations of links and nodes which can establish a path are potentially unlimited, in practice, the goal is to minimize signal degradation and maximize correct transmission of data. Thus, the need to optimize links between nodes and ultimately, the path S-T.

The parameters that are used to satisfy QoS requirements can be either cumulative or non-cumulative. Non-cumulative parameters are those that do not add together or "accumulate" by the addition of subsequent nodes and links. However, it might be the case that the quality of the overall path is limited by the link or node with the worst non-cumulative parameters. Examples of non-cumulative parameters are bandwidth and access rights. The non-cumulative parameters can be easily handled by simply ignoring the links that do not fulfill the QoS requirements during the path selection process. Cumulative parameters can be either additive (e.g., delay, jitter and administrative weight) or multiplicative (e.g., loss probability). The simultaneous presence of more than one cumulative parameter is difficult to handle.

The problem of finding a path which fulfills two simultaneous cumulative parameters or finding a minimum cost path which satisfies only one cumulative parameter is designated "NP-Hard." "NP" means "Non-deterministic Polynomial." See, for example, the book "Combinatorial Optimization" by W. J. Cook, W. H. Cunningham, W. R. Pulleyblank, and A. Schrijver (John Wiley & Sons, 1998) for more details, the contents of which are incorporated herein by reference.

There are two classes of methods used to solve NP-Hard problems. Methods of the first class, referred to as "Optimal-Solution" methods, guarantee an optimal solution, but are complex and relatively slow. The second class is referred to as "Approximation" methods, and use a heuristic (trial and error) or approximation technique to solve the NP-Hard problem. Approximation methods usually run fast, but they do not result in the optimal solution. They do, however, provide a solution that is near-optimal. Approximation methods usually do not guarantee the quality of their results and hence they need to be thoroughly tested. Additionally, the solution for both classes of methods cannot be expressed as a polynomial.

For both classes of methods, it is highly desirable to increase the theoretical guarantees on the running time of the method and the quality of the result of the method. With respect to Optimal Solution methods, one example is a "Breadth-First Search" method. This method determines the delay of all initial links, and then, building on that link, considers subsequent links, again, using only the one with the minimal delay. For example, referring again to FIG. 2, to establish a path from node S to node T, the Breadth-First Search method would first determine the delay in links S-A, S-B and S-C. The method would then select the link with the least delay, e.g. S-C, and then determine which links out of C-B, C-X, C-Y and C-Z have the smallest delay. The delay for each link is determined and is added to the previous links, to maintain a running total. This continues until either the destination is reached, the delay constraint is reached, or there is no possibility to improve the path. However, the "Breadth-First Search" method is guaranteed to be fast, but can find a minimal path for only one cost (delay in this example). The Dijkstra algorithm is an example of a sophisticated Breadth-First search method.

There are several well known methods of the Approximation class of methods. One example is "Fallback Routing" which tries to find an appropriate path which meets all the QoS requirements. It tries one path after another, until a suitable path has been found, or no path is found that satisfies all the QoS requirements. This method is very simple, fast and always gives an appropriate solution if it exists. There is no guarantee, though, of finding the optimal path and no guarantee of the quality of the path found.

Both classes of well known methods, Approximation and Optimal-Solution, have significant drawbacks. Optimal-Solution methods provide an optimal solution, but are complex to use and relatively slow. Approximation methods run much quicker, but provide medium quality results and some types do provide a guarantee of the quality of the result. However, the better the guarantee of result, the slower the Approximation method runs. Additionally, it has been shown that for NP-Hard problems, no algorithm exists that determines a solution, the running time of which, can be expressed in polynomial form.

Thus, there has been demonstrated a genuine need for a method which is simple and easy to use, runs relatively quickly, and presents high quality optimal solutions for the problem of selecting a path in a telecommunications network that meets specified QoS requirements. The method of the present invention fulfills the long-felt need of choosing effective paths in modern telecommunication networks.

SUMMARY OF THE INVENTION

The invention is a method of determining a path in a communications system that minimizes a cost function and satisfies an additional constraint, these constraints referred to as QoS requirements, thereby providing a solution to the QoS routing problem. The method determines the path in a manner that is both efficient in time, and effective in quality of result.

It is an object of the invention to provide a method that finds an optimal path in terms of minimal cost, the running time of which can be predicted.

It is an object of the invention to provide a method that finds an optimal path in terms of minimal cost, the running time of which can be predicted and is shown to be a polynomial expression.

It is an object of the invention to provide a method that finds an optimal path in terms of minimal cost, that provides guarantees for each solution.

It is another object of the invention to provide a method that determines an optimal path, out of many paths, which minimizes cost and satisfies a delay constraint.

It is another object of the invention to provide a method that determines an optimal path, out of many paths, which minimizes cost and satisfies a delay constraint, in an efficient and economical manner.

It is another object of the invention to provide a method that determines an optimal path, out of many paths, which minimizes cost and satisfies a delay constraint, the running time of which can be predicted.

It is another object of the invention to provide a method that determines an optimal path, out of many paths, which minimizes cost and satisfies a delay constraint, the running time of which can be predicted and expressed in a polynomial format.

It is another object of the invention to provide a method that determines an optimal path, out of many paths, which minimizes cost and satisfies a delay constraint, and provides guarantees for each solution.

It is still another object of the invention to provide a method that determines an optimal path that minimizes cost and satisfies multiple constraints.

It is still another object of the invention to provide a method that determines an optimal path that minimizes cost and satisfies multiple constraints, in an efficient and economical manner.

It is still another object of the invention to provide a method that determines an optimal path that minimizes cost and satisfies multiple constraints, the running time of which can be predicted.

It is still another object of the invention to provide a method that determines an optimal path that minimizes cost and satisfies multiple constraints, the running time of which can be predicted and expressed in a polynomial format.

It is still another object of the invention to provide a method that determines an optimal path that minimizes cost and satisfies multiple constraints, and provides guarantees for each solution.

In accordance with one embodiment of the invention, the above identified and other objectives are achieved by determining a first path which has a first path cost and a first path delay, the first path cost being a minimum cost, determining a second path which has a second path cost and a second path delay, the second path being a minimum delay, calculating a Lagrange relaxation variable, determining a third path that minimizes a first modified cost function, calculating a second modified cost function for the first path, and determining the minimum cost and minimum delay path according to the first and second modified cost function.

BRIEF DESCRIPTION OF THE FIGURES

The novel features believed characteristic of the invention are set forth in the appended claims. The invention itself, however, as well as other features and advantages thereof will be best understood by reference to the detailed description of the specific embodiments which follows, when read in conjunction with the accompanying drawings.

DETAILED DESCRIPTION OF THE INVENTION

Figure 1:
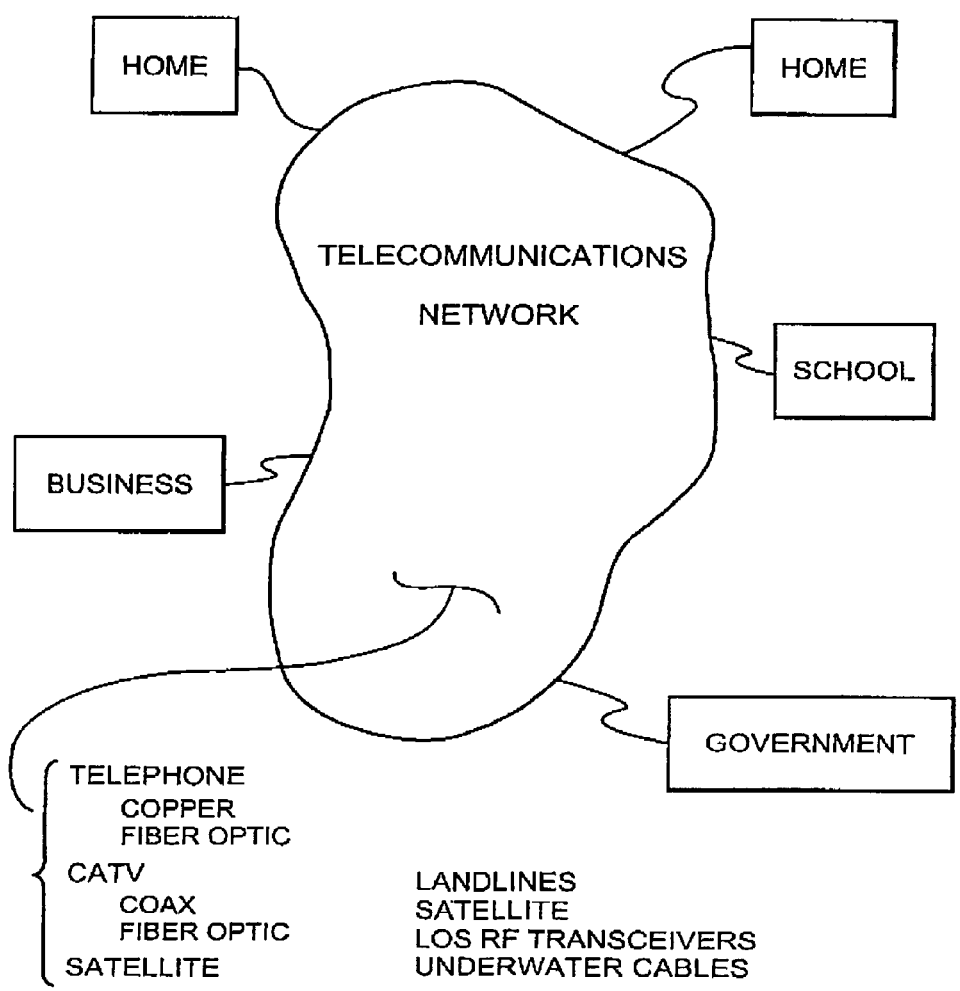
FIG. 1 is an illustration of a modern telecommunications environment.

The preferred embodiment of the invention solves the problem of determining an optimal path, in terms of one or more constraints, in a communications system, in a minimal amount of time. The present invention combines the well known Dijkstra algorithm (described below) with use of the Lagrange relaxation technique. Conceptually, any communication system can be thought as a collection of nodes and links. A collection of nodes is a "set" of nodes, and a collection of links is a "set" of links. A cost function can be written which describes cost as a function of the set of links. Recall that "cost" is simply any criteria that specifies a QoS for a link or node. There are constraint functions $d_1, d_2 \ldots d_k$ that describe the different constraints on costs that might be placed on a path in the network. The constraint functions $d_1, d_2 \ldots d_k$ have maximum constraints or limits $D_1, D_2 \ldots D_k$. The task, therefore, is to find a path p from s to t (S-T) such that $d_i(p) \leq D_i$, (i.e. the constraint value of interest for path p is less than the maximum allowable value for that constraint) for all $i=1 \ldots k$ and the cost of path p is minimal with respect to the cost function c among the paths satisfying the constraints.

For purposes of illustration, path p, from S-T, might be the path consisting of the following links: S-A, A-X and X-T. Likewise, path q, from S-T, could consist of the following links: S-A, A-Y and Y-T. D is the maximum allowable delay, and d(p) is the delay associated with path p (assuming a path "x" exists), and c(p) is the cost associated with path p. The constraints $d_l$ describe the different constraints on paths (i.e., bandwidth, jitter, time-shift, etc.) that might be placed in the network.

In one embodiment of the invention, there are only two constraints, cost and delay, to be minimized. The cost can be quantified in terms of any types of QoS parameters, including, but not limited to, number of hops, an additive monetary cost, or preference given by the administrator. The delay constraint is relaxed using the well-known Lagrange relaxation method. In the Lagrange relaxation method, the constraint is eliminated but it is built in the object function. That is, we eliminate looking directly to solve the problem of minimizing for the constraint in the paths, but, instead, indirectly solve for the constraint, by inserting the Lagrange variable (which represents the desired constraint) into the cost ("object") function, described above. In this way, what is originally very difficult to do directly, becomes much easier to perform indirectly.

In performing the Lagrange relaxation method, a variable $\lambda \geq 0$ is introduced and for a fixed $\lambda$, we are looking for an S-T path $P_\lambda$ which approaches the following minimum:

$$L(\lambda) = \min\{c(P) + \lambda \cdot d(P) - \lambda \cdot D\};$$

which can also be written as:

$$L(\lambda) = \min\{c_\lambda(P)\} - \lambda \cdot D$$

It is easy to find such path because $\lambda \cdot D$, i.e., the relaxed maximum delay constraint for any path, does not depend on the path P, so the task is to find a minimum cost path with respect to the modified cost function:

$$c_\lambda(x) = c(x) + \lambda \cdot d(x)$$

where x is a path from S-T (and is different then P).

It can be proved that $L(\lambda)$ is a lower bound of the original problem for any $\lambda \geq 0$. So, the best lower bound can be obtained by maximizing the function $L(\lambda)$. The term lower bound means the theoretical best solution. Let:

$$L^* = \max\{L(\lambda): \lambda \geq 0\}$$

and suppose $\lambda^*$ maximizes the function $L(\lambda)$ [i.e. $L(\lambda^*) = L^*$]. Then, it can also be shown that there is a path P* which minimizes the cost function $c_\lambda$ and satisfies the delay constraint. Moreover, it can be seen that this path is the best that can be found by minimizing combined cost functions.

Figure 3A:
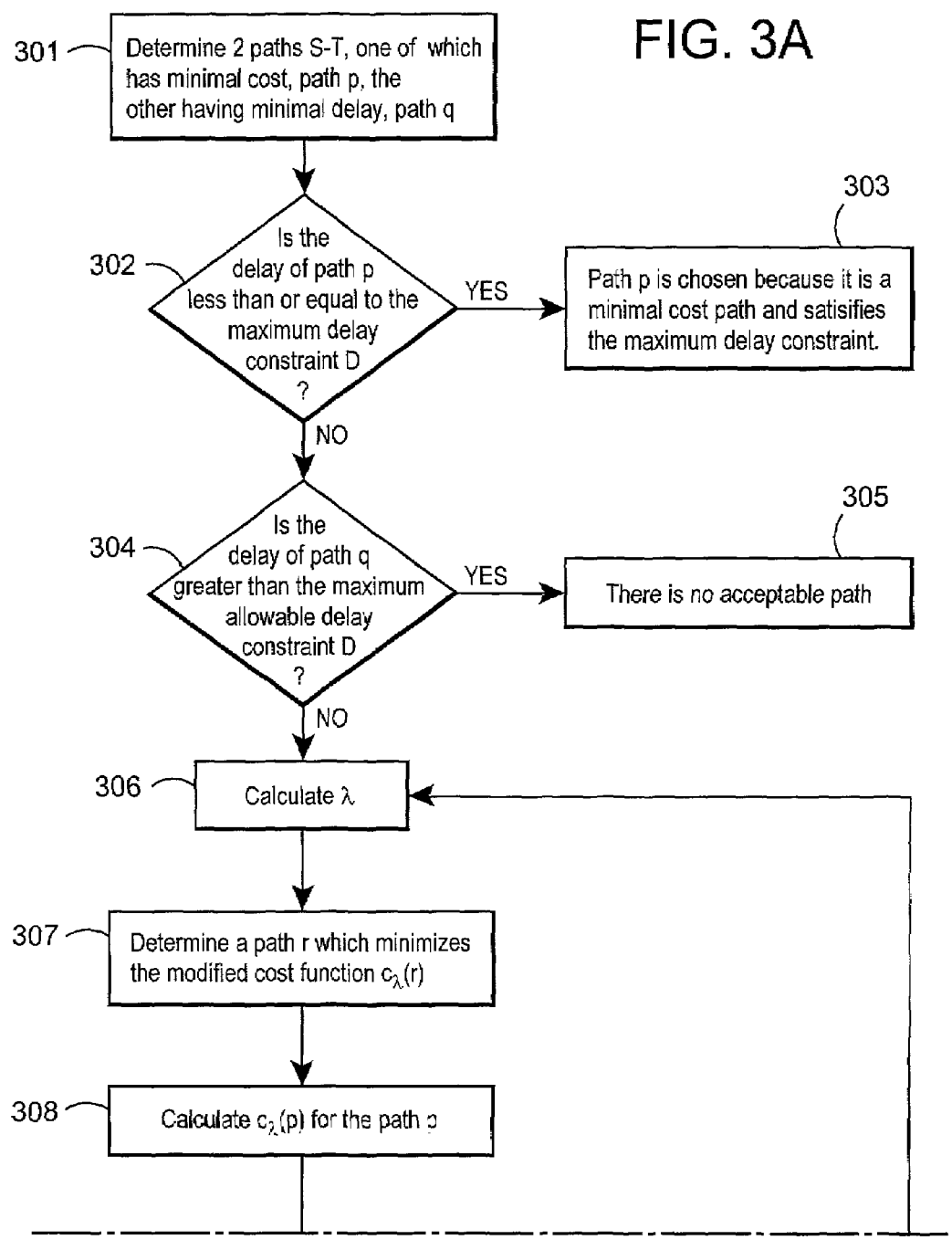
FIGS. 3A and 3B illustrate a method for selecting a path in a communications system according to the preferred embodiment of the invention.
Figure 3B:
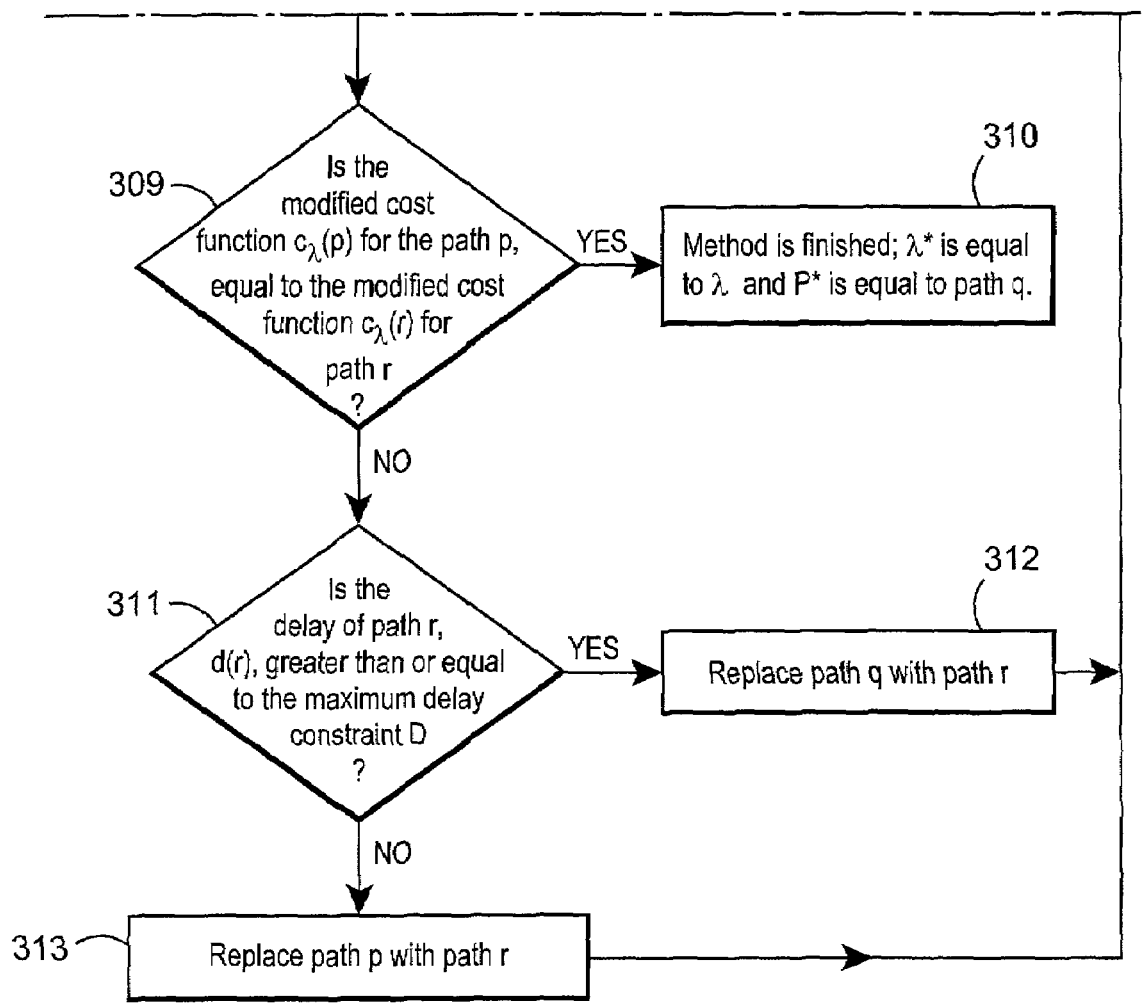

FIGS. 3A and 3B illustrate a method for selecting a path in a communications system according to one embodiment of the invention.

The method presented below maximizes the function $L(\lambda)$ and finds the desired path P*. This method, the preferred embodiment of the invention, is very efficient in practice and its running time, i.e. number of steps, can be estimated in a polynomial expression.

Initially, a path p between nodes S and T which has a minimal cost and a path q between nodes S and T which has a minimal delay are determined (step 301) through use of the Dijkstra algorithm. The Dijkstra algorithm is a very well known algorithm for finding a shortest path in a weighted directed graph. A directed graph is simply a set of nodes and links, as in FIG. 2. "Weighted" means that each link (and node) has a cost associated with it. Accordingly, the Dijkstra algorithm is performed once using cost of each link to find the minimal cost path and it is performed once using the delay of each link to find the minimal delay path. Next it is determined whether the delay of path p is less than or equal to the maximum delay constraint D (step 302). If the delay is less than or equal to the maximum delay constraint ("Yes" path out of decision step 302) then path p is selected since it is the minimal cost path which also satisfies the maximum delay constraint (step 303). Then, the result is:

$$\lambda^* = 0 \text{ and } P^* = p$$

where $\lambda^*$ is the $\lambda$ that maximizes the function $L(\lambda)$ and P* is the solution, i.e. the path that satisfies the delay constraints and minimizes the cost.

If, however, the delay of path p is greater than the maximum delay constraint ("No" path out of decision step 302), then it is determined whether the delay of path q, i.e., the minimal delay path, is greater than the maximum delay constraint D (step 304). If the delay of path q is greater than the maximum delay constraint D ("Yes" path out of decision step 304), then it is determined that there is no acceptable path between nodes s and t (step 305).

If it is determined that the delay of path q is less than the maximum delay constraint D ("No" path out of decision step 304), then the Lagrange relaxation variable $\lambda$, which is equal to the difference in cost between paths p and q, divided by the difference in delay between paths q and p, is calculated (step 306):

$$\lambda = \frac{c(p) - c(q)}{d(q) - d(p)}$$

Next a path r is selected which minimizes the modified cost function $c_\lambda(r)$ (step 307). The path r is found through use of the Dijkstra algorithm. The modified cost function is defined as:

$$c_\lambda(r) = c(r) + \lambda \cdot d(r)$$

where:
c(r) is the cost of the r path; and
d(r) is the delay of the r path.

The modified cost function $c_\lambda(p)$ for path p is then calculated (step 308). It is then determined whether the modified cost function for path r, $c_\lambda(r)$, is equal to the modified cost function for path p, $c_\lambda(p)$, (step 309). If the modified cost function for path r is equal to the modified cost function for path p ("Yes" path out of decision step 309), then it is determined that the value for the Lagrange relaxation variable $\lambda$ is a value which maximizes the function $L(\lambda)$ (the value of $\lambda$ determined in step 306) and that path q is a path which minimizes the modified cost function $c_\lambda$ (step 310). The method then has accomplished its goal of finding an appropriate path which is path q, as path p fails the delay requirement and path q fulfills it.

If, however, it is determined that the modified cost function for path r is not equal to the cost function for path p ("No" path out of decision step 309), then it is determined whether the delay of path r, d(r), is greater than or equal to the maximum delay constraint D (step 311). If the delay of path r is less than the maximum delay constraint ("No" path out of decision step 311), then path q is replaced by path r (step 312), and the method reverts back to step 306. In step 306, a new $\lambda$ value is calculated, with the new path q (the path r just determined), and steps 307–309 again occur, with the new $\lambda$ value.

If, however, the delay of path r is greater than or equal to the maximum delay constraint D ("Yes" path out of decision step 311), then path p is replaced by path r (step 313) and the method reverts back to step 306. In step 306, a new $\lambda$ value is calculated, with the new path p (the path r just determined), and steps 307–309 again occur, with the new $\lambda$ value.

The Dijkstra algorithm is used in step 301 (to determine two S-T paths: p, minimal cost, and q, minimal delay) and in step 307 (to determine an S-T path r which minimizes the modified cost function $c_\lambda(r)$). Each time the Dijkstra algorithm is employed, it is for a single nonnegative cost or lengthcostcost function only, i.e. the Dijkstra algorithm can find a shortest path for one cost function only.

Since there are only a finite number of different paths in the network the present invention will determine an optimal Lagrange relaxation variable $\lambda$ in a finite number of steps. The optimal Lagrange relaxation variable, $\lambda_{opt}$, is that smallest $\lambda$ for which the delay constraint of its associated "r" path is at most the maximum allowable delay constraint, D. The running time of the method of FIGS. 3A and 3B can be shown to be expressed as a polynomial, because this method is an approximation of the NP-Hard QoS routing problem, and not an absolute solution. To find the running time of the algorithm, the notation O(x) is used, which is defined as follows:

$$g(x) = O(f(x))$$

if there exists a constant c, c>0, such that:

$$g(x) \leq c \cdot f(x),$$

for all x.

With this notation, the number of iterations (i.e. the number of executions of the main loop of the algorithm, steps 306 to 313 of FIGS. 3A and 3B), can be shown to be:

$$O(m \cdot \log^3 m)$$

where m equals the number of links in the directed graph (or communication system). The only real time consuming parts of the main loop (and so in the entire algorithm) are the "calls" to use the Dijkstra algorithm (once in each iteration, plus twice during the initialization of "p" and "q"). Since the running time of the Dijkstra algorithm is expressed as:

$$O(m \cdot \log m)$$

the entire running time is expressed as:

$$O((m \cdot \log^3 m + 2)(m \cdot \log m) = O(m^2 \cdot \log^4 m).$$

It has been recognized that there are two situations in which an optimal Lagrange relaxation variable $\lambda$ does not produce an optimal path. These situations are illustrated in FIGS. 4A, 4B, 5A and 5B.

Figure 4A:
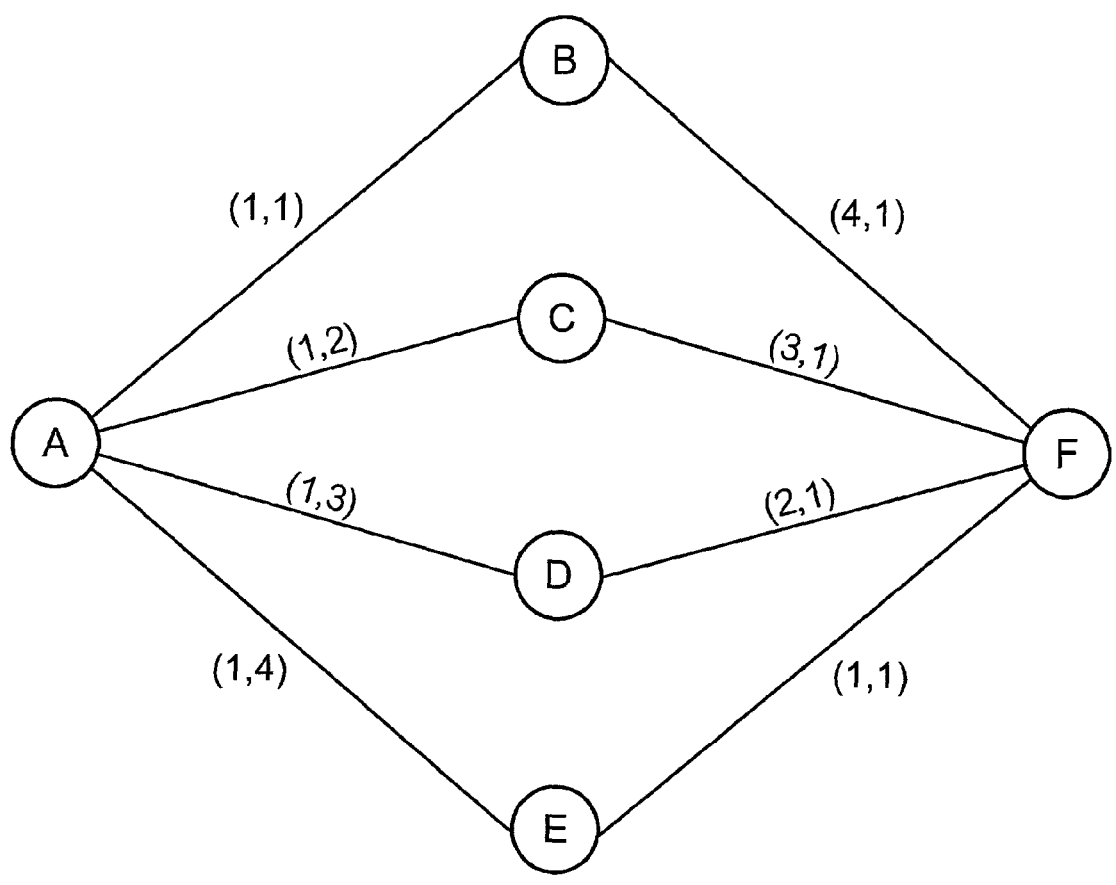
FIGS. 4A and 4B respectively illustrate a network and the Lagrange function of the network in which several paths have the same modified cost function at an optimal Lagrange relaxation variable.

Referring to FIG. 4A, there is illustrated a multinode network, with six nodes: A, B, C, D, E and F, and eight links: A-B, B-F, A-C, C-F, A-D, D-F, A-E and A-F. Each link has a cost and a delay, shown in the parentheses, wherein the first number is the cost and the second the delay. There are four paths from A-F: A-B-F, A-C-F, A-D-F, and A-E-F.

Figure 4B:
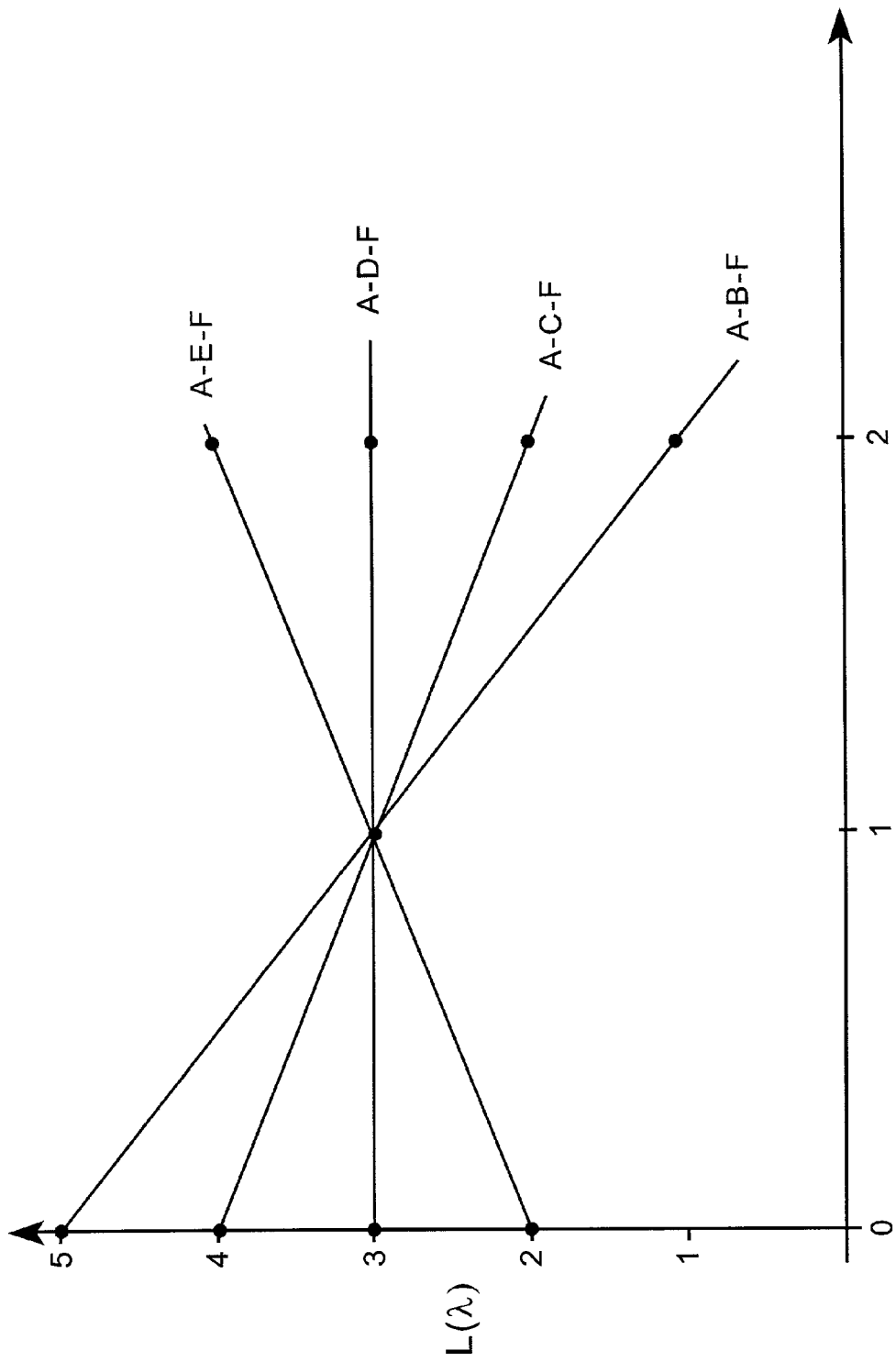

Referring now to FIG. 4B, there is illustrated a diagram in which all the values of $L(\lambda)$ for each path is plotted against $\lambda$ values equal to 0, 1, and 2. The "y" axis represents $L(\lambda)$, and the "x" axis represents $\lambda$. Recall that the equation for $L(\lambda)$ is given by:

$$L(\lambda) = c_\lambda(r) - \lambda \cdot D.$$

In FIG. 4B, the values for $L(\lambda)$ have been plotted against the corresponding $\lambda$ values, and it is shown that all the paths, from A-F, have the same $c_\lambda$ at the optimal $\lambda$ value. Table I illustrates the calculations performed to obtain $L(\lambda)$ for the various paths. At the optimal $\lambda$ ($\lambda_{opt}$), the paths all have the same modified cost function, $c_\lambda(r)$. In this instance, $\lambda_{opt}=1$ and $c_\lambda(r)$, for $\lambda=1$, is 7, for all paths.

TABLE I

| | | | D = 4 | | | | |
| | | | $c_\lambda$ @ | | | $L(\lambda)$ @ | |
| Path | Cost | Delay | $\lambda = 0$ | $\lambda = 1$ | $\lambda = 2$ | $\lambda = 0$ | $\lambda = 1$ | $\lambda = 2$ |
|---|---|---|---|---|---|---|---|---|
| A-B-F | 5 | 2 | 5 | 7 | 9 | 5 | 3 | 1 |
| A-C-F | 4 | 3 | 4 | 7 | 10 | 4 | 3 | 2 |
| A-D-F | 3 | 4 | 3 | 7 | 11 | 3 | 3 | 3 |
| A-E-F | 2 | 5 | 2 | 7 | 12 | 2 | 3 | 4 |

Since all of the paths illustrated in FIG. 4A have the same modified cost function value, the present invention may not be able to select the optimal path. Although the situation illustrated in FIG. 4A appears to be problematic, in real networks this situation will not likely occur, and hence, is not worthy of any special consideration.

Figure 5A:
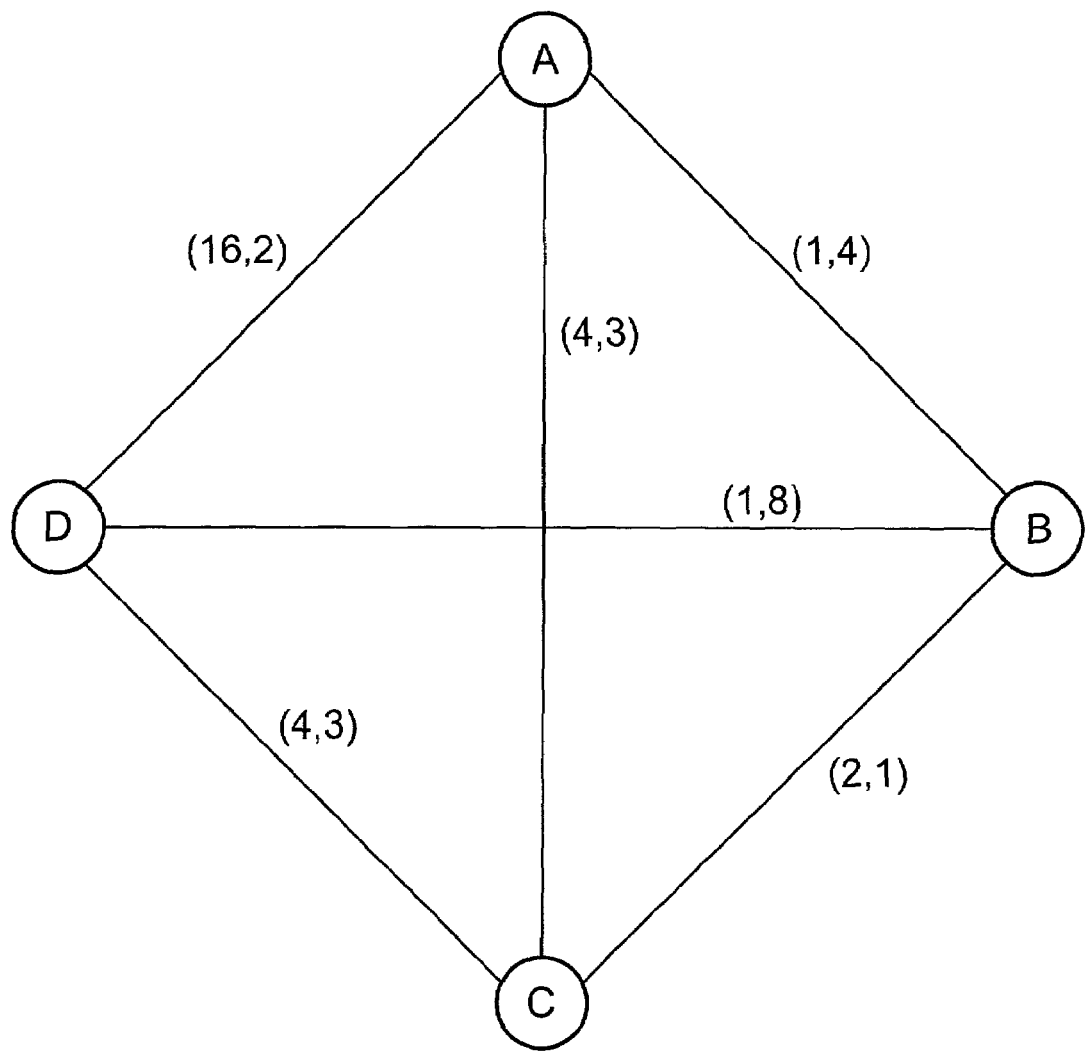
FIGS. 5A and 5B respectively illustrate a network and the Lagrange function of the network in which an optimal path has a higher modified cost than a sub-optimal path at an optimal Lagrange relaxation variable.
Figure 5B:
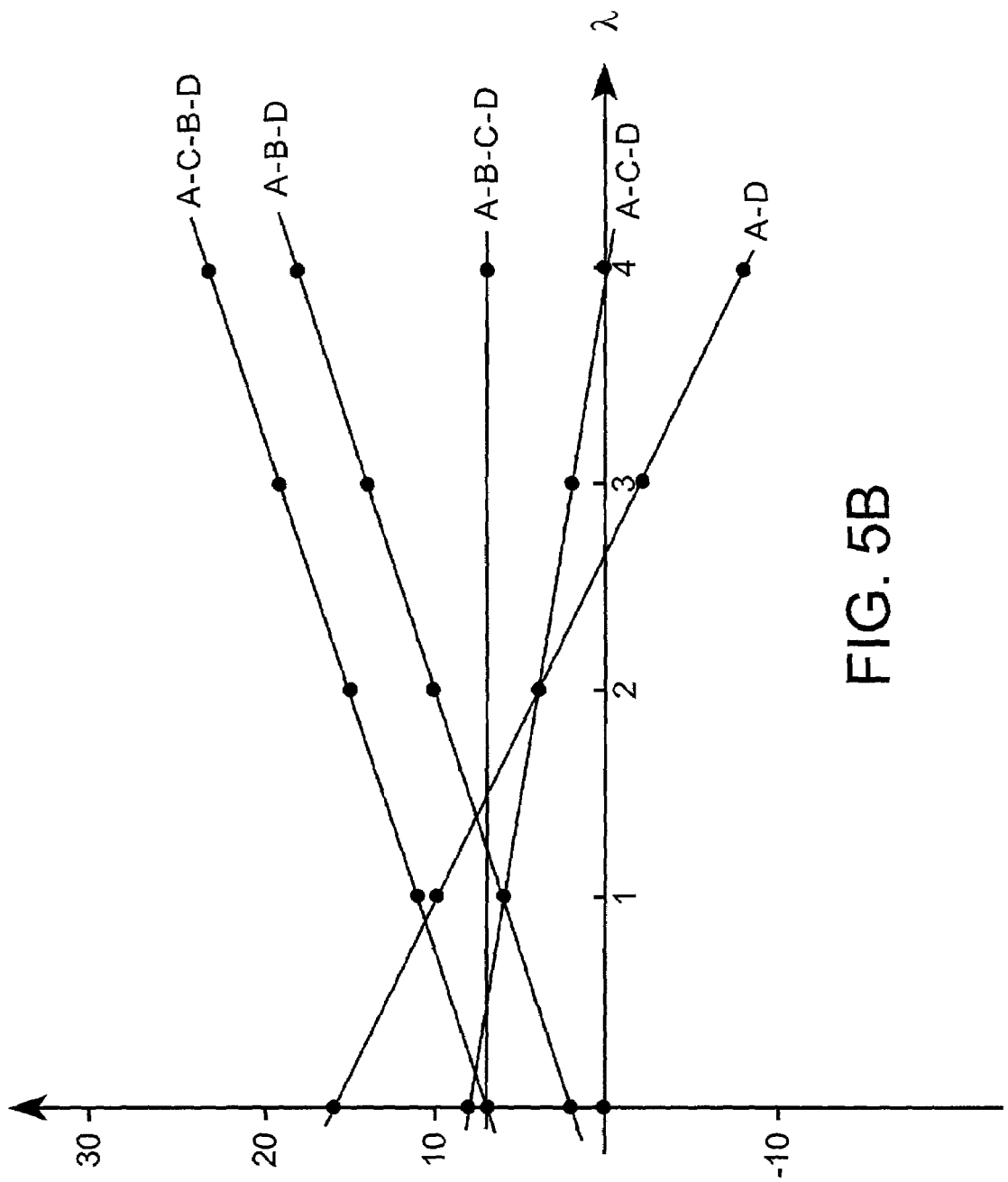

Referring to FIG. 5A, there is illustrated another multinode network, with four nodes, A, B, C and D, and six links, A-D, A-B, A-C, B-D, B-C and C-D. There are five paths from A-D: A-D, A-B-D, A-C-D, A-B-C-D, and A-C-B-D. In FIG. 5B, there is illustrated a diagram in which all the values of $L(\lambda)$ for each path are plotted, as was done in FIG. 4B.

Table II illustrates the calculations to determine $L(\lambda)$, as was done in FIG. 4A.

TABLE II

| | | | D = 8 | | | | | | | | |
| | | | $c_\lambda$ @ | | | | | $c_\lambda - \lambda D$ @ | | | |
| Path | Cost | Delay | $\lambda = 0$ | $\lambda = 1$ | $\lambda = 2$ | $\lambda = 3$ | $\lambda = 4$ | $\lambda = 0$ | $\lambda = 1$ | $\lambda = 2$ | $\lambda = 3$ | $\lambda = 4$ |
|---|---|---|---|---|---|---|---|---|---|---|---|---|
| A-D | 16 | 2 | 16 | 18 | 20 | 22 | 24 | 16 | 10 | 4 | -2 | -8 |
| A-B-D | 2 | 12 | 2 | 14 | 26 | 38 | 50 | 2 | 6 | 10 | 14 | 18 |
| A-C-D | 8 | 6 | 8 | 14 | 20 | 26 | 32 | 8 | 6 | 4 | 2 | 0 |
| A-B-C-D | 7 | 8 | 7 | 15 | 23 | 31 | 39 | 7 | 7 | 7 | 7 | 7 |
| A-C-B-D | 7 | 12 | 7 | 19 | 31 | 43 | 55 | 7 | 11 | 15 | 19 | 23 |

However, FIGS. 5A and 5B illustrate the situation in which a optimal Lagrange relaxation variable λ does not produce an optimal path. Specifically, the network of FIG. 5A will produce a modified cost function $c_{80}$ which is higher than a sub-optimal path at the optimal λ.

Figure 6A:
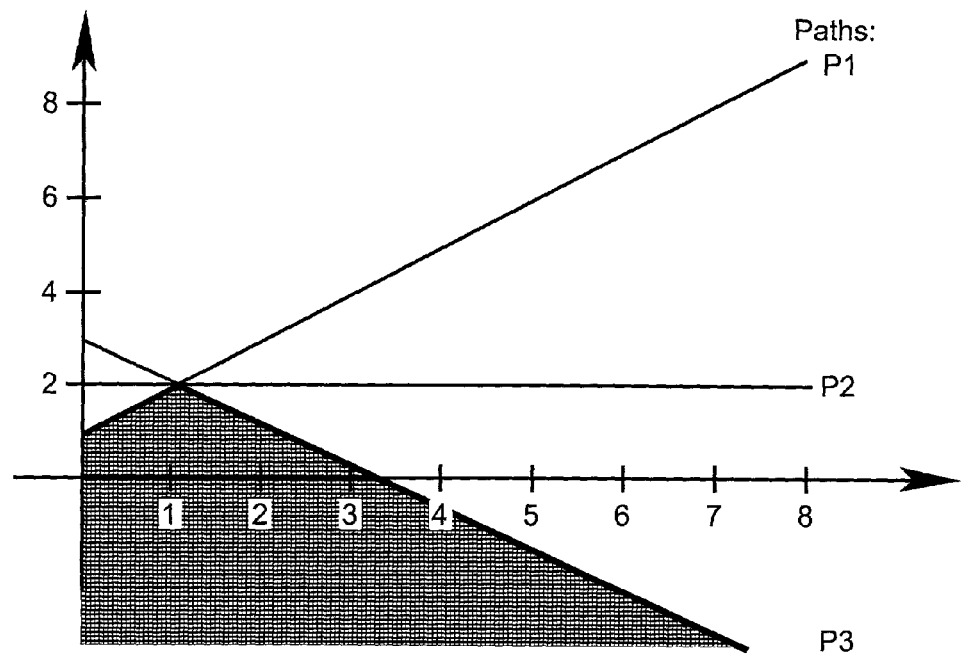
FIGS. 6A and 6B respectively illustrate the Lagrange function of a network using linear cost and using square cost.
Figure 6B:
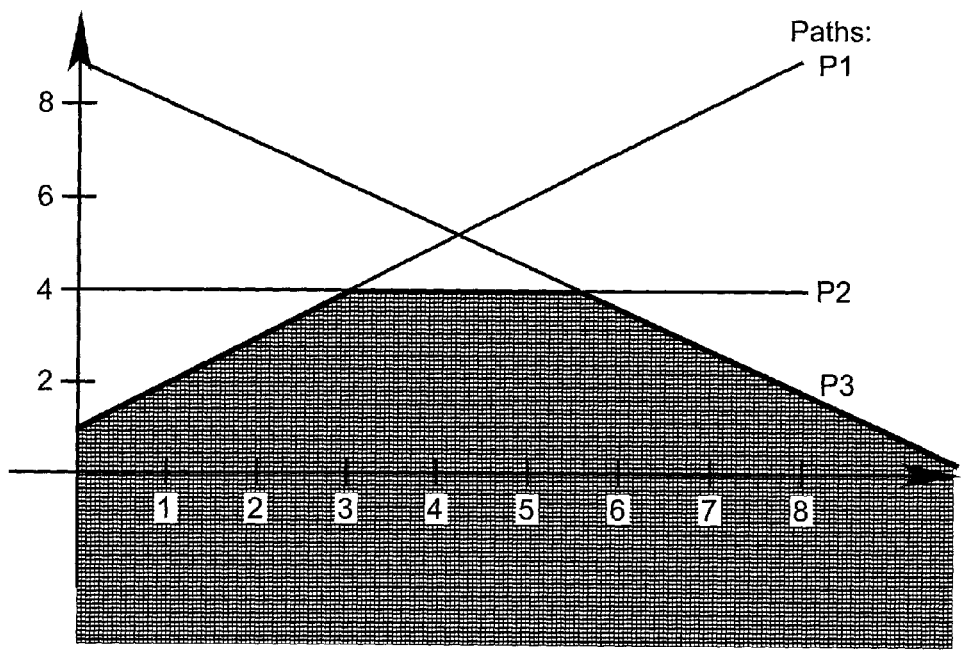

To address the situation illustrated in FIGS. 5A and 5B, the influence of the cost in the modified cost function can be increased. FIG. 6A illustrates the Lagrange function of a network with linear cost. If, as illustrated in FIG. 6B, the cost were raised to the second power in cλ, the effect of the cost becomes stronger. Therefore, the chance of the optimal path having both the smallest $c_\lambda$ at the optimal λ increases. Since the delay remains linear, the difference between the modified cost function and the delay constraint, i.e., $c_\lambda - D$, remains a linear function in λ for all paths. Further, it does not violate the convergence of the algorithm. Referring to FIGS. 6A and 6B, it will be noticed that the modifying of the modified cost function $c_\lambda$ does not influence the slope of the lines (i.e., $c_\lambda - D$ on λ), and instead it just shifts the lines farther off each other.

Figure 7:
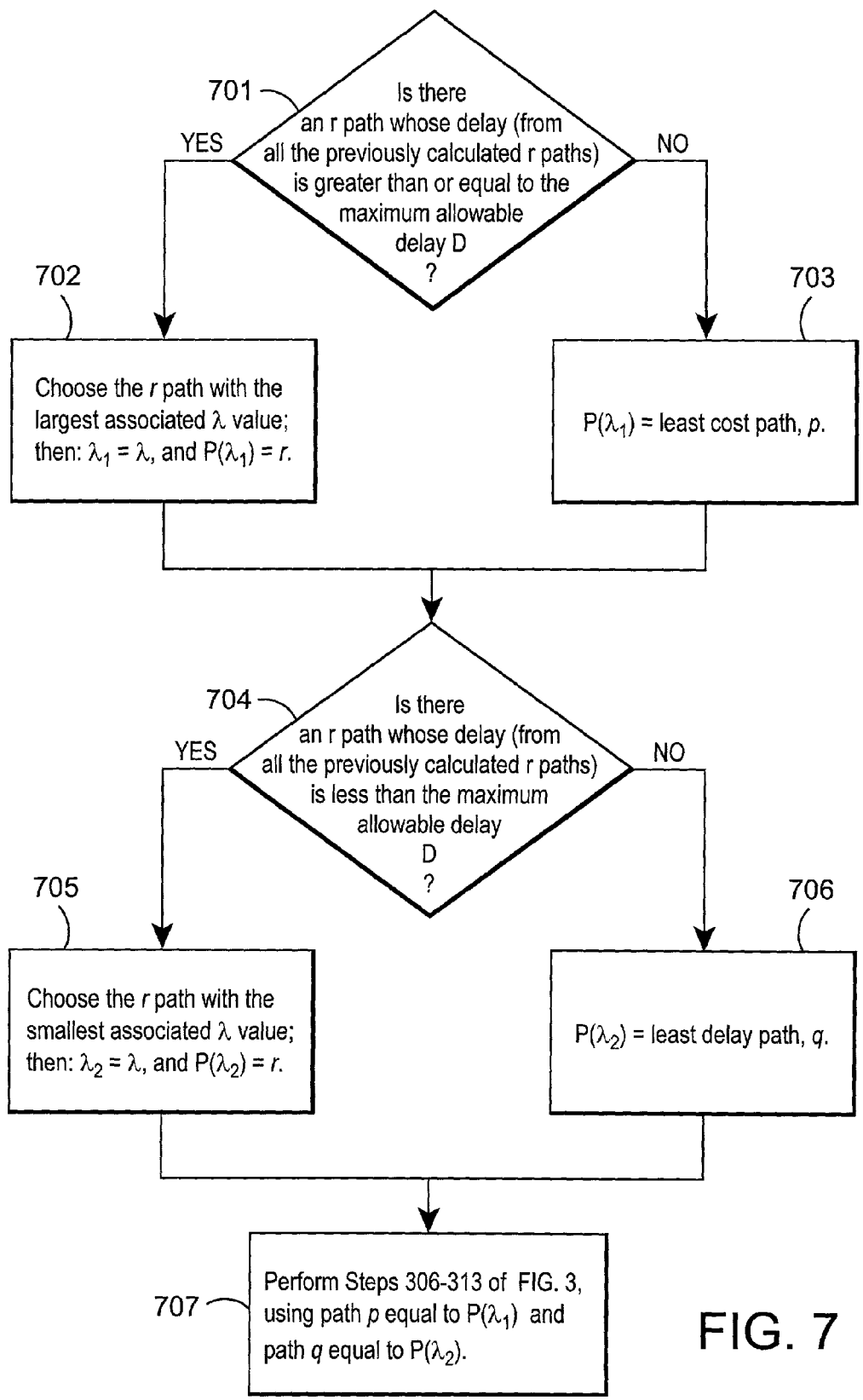
FIG. 7 illustrates a method for selecting a path in a communications system according to the preferred embodiment of the invention, with a first additional feature.

FIG. 7 illustrates a method for selecting a path in a communications system according to the preferred embodiment of the invention, with a first additional feature.

Figure 2:
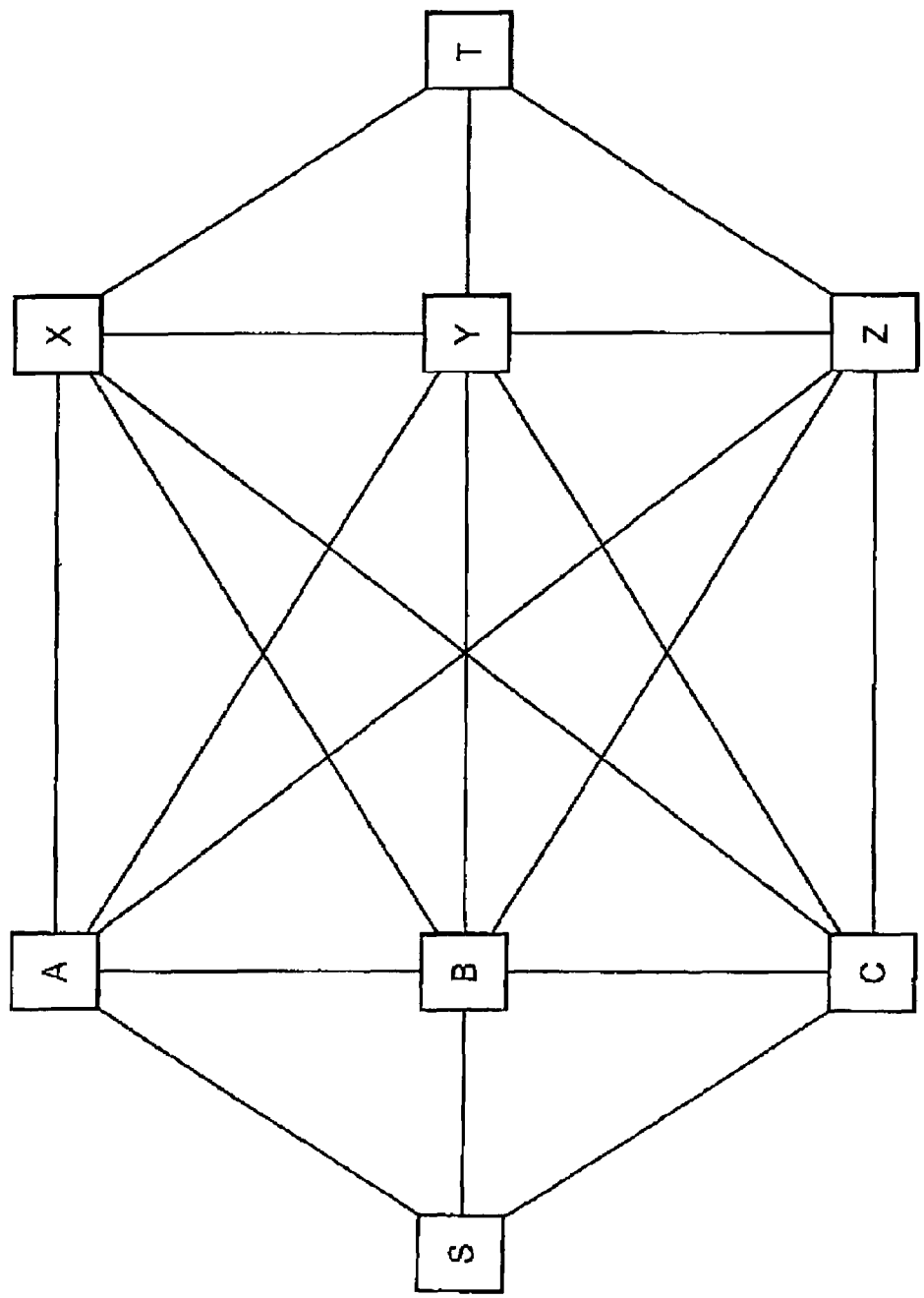
FIG. 2 is an illustration of the switching path component of the telecommunications environment and demonstrates the nodes and set of links in a communication system.

In this embodiment of the invention, the method is made more efficient when a path is found from a node to many other nodes. This is important, because, in implementation practical routing methods provide QoS work in routers and their task is not only to find an appropriate path to a certain other node, but they have to find paths to a bulk of destinations. The most resource consuming part of the method described with respect to FIG. 7 is finding minimal S-T paths with respect to the cost function $c_\lambda$ (i.e. paths that are inexpensive, or, as inexpensive as possible). However, when the Dijkstra algorithm is "run" or employed in a weighted, directed graph (as shown in FIG. 2, for example), it generates path information for all paths originating at node S, to all possible destinations, and provides the minimum cost path for each source-destination pair.

Therefore, in this alternate embodiment of the invention, whenever the Dijkstra algorithm is used with the modified cost function $c_\lambda$, the entire output of the algorithm is stored. This does not consume excessive amounts of memory because the resultant paths form a tree. For improved efficiency, the costs and the delay of these paths are also stored. The data can be stored in either a binary search tree or in a balanced search tree in order to access it easily.

When the Lagrange relaxation variables λ were calculated previously, a path r was determined which minimized the modified cost function $c_\lambda$, and which is known as $c_\lambda(r)$. Each path r, has a delay, d(r), and cost, c(r), associated with it. The first step in an improvement for selecting a path in a communications system (step 701) is to determine whether there exists a previously calculated path r having a delay greater than or equal to the maximum allowable delay D:

$$d(r) \geq D$$

If there is such a path, or paths, then in step 702 ("Yes" decision of step 701), the r path associated with the largest Lagrange relaxation variable λ is chosen, and is designated $P(\lambda_1)$. The Lagrange relaxation variable λ associated with that r path is known as $\lambda_1$. If there are no such paths, i.e. all the previously determined r paths have a delay d(r) less than the maximum allowable delay D ("No" decision of step 701), then in step 703 path p is selected as path $P(\lambda_1)$.

Similarly, in step 704, the delay of the r paths is checked to determine whether there exists a previously calculated path r having a delay greater than the maximum allowable delay D:

$$d(r) < D$$

If there is such a path, or paths, then in step 705 ("Yes" decision of step 704), the r path associated with the smallest Lagrange relaxation variable λ is chosen, and is designated $P(\lambda_2)$. The Lagrange relaxation variable λ associated with that r path is known as $\lambda_2$. If there are no such paths, i.e. all the previously determined r paths have a delay greater than or equal to the maximum allowable delay D ("No" decision of step 704), then in step 706 path q is selected as $P(\lambda_2)$.

Following these steps, the method of FIGS. 3A and 3B is followed, using path p equal to $P(\lambda_1)$ and path q equal to $P(\lambda_2)$.

In an additional embodiment of the invention, an improved stop condition is implemented. An important feature of the method is that the path q always satisfies the delay constraint and it is replaced only when another path satisfies the same delay constraint and the cost of the new path is better than the previous one.

As discussed above path p is a least cost path between nodes S and T, and path q is a path between nodes S and T which has minimal delay. If it determined that the cost of path q is within a certain percentage of the cost of path p, significant processing resources can be saved by simply selecting path q for carrying the traffic. This can be referred to as a "stop" condition, and can be performed between steps 304 and 306 of FIG. 3A. This improves the running time, even if the error factor is very small, because only the last shortest path is eliminated from being calculated in most cases. There is no significant loss of quality, since finding additional paths is done to ensure finding the optimal path.

Figure 8:
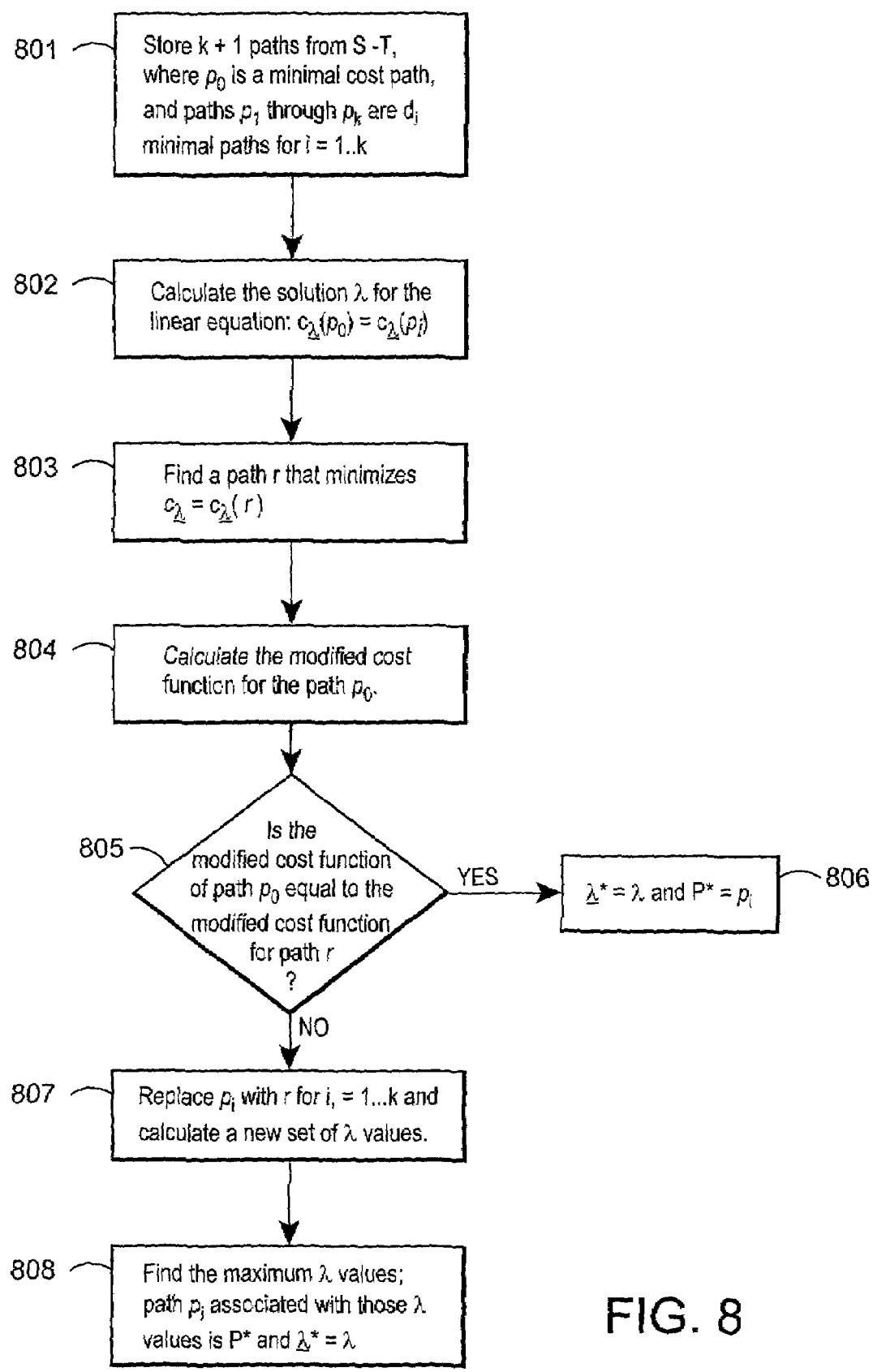
FIG. 8 illustrates a method for selecting a path in a communication system, according to an alternate embodiment of the invention.

FIG. 8 illustrates a method for selecting a path in a communication system, according to an alternate embodiment of the invention.

In this embodiment of the invention, the method described above can be extended to the case of multiple constraints. Additional constraints can be packet loss, phase shift, jitter, etc. In this case the method cannot guarantee that the resulted path fulfills all requirements but it attempts to reach a good compromise. It is immaterial the classification of the constraints, since a multiplicative constraint can be transformed to an additive constraint by using a logarithm approach (i.e., $\log(a \cdot b) = \log a + \log b$).

In this general case a new variable $\lambda_i$, is introduced for each constraint $d_i$. In this case, "d" does not just signify delay, it denotes a different type of constraint. For example, $d_1$ could be delay, $d_2$ could be packet loss, $d_3$ could be phase shift, etc. The modified cost function $c_{\underline{\lambda}}(x)$ (for some path x) is defined as:

$$c_{\underline{\lambda}}(x) := c(x) + \sum_{i=1}^{k} \lambda_i d_i(x)$$

and $L(\underline{\lambda})$ is a lower bound of the optimal solution for all $\underline{\lambda}$, defined as:

$$L(\underline{\lambda}) = \min\left\{c_{\underline{\lambda}}(p) - \sum_{i=1}^{k} \lambda_i D_i\right\}$$

where $\underline{\lambda} := (\lambda_1, \lambda_2, \ldots \lambda_k)$, and k is the number of constraints. Since the value $L(\underline{\lambda})$ is a lower bound of the optimal solution for all $\underline{\lambda}$, the goal is to find a vector $\underline{\lambda}^*$ which maximizes the function $L(\underline{\lambda})$ in the same manner as when there was one constraint. In addition we want to find a $c_{\underline{\lambda}}$ minimal S-T path.

Initially, a number of paths are labeled $p_0, p_1, p_2 \ldots p_k$ (which is one greater than the number of constraints) and stored (step 801). The path $p_0$ is a least cost (c-minimal) path, and $p_i$ are $d_i$ minimal paths for all $i=1 \ldots k$. For example, if the four constraints are cost, delay, jitter and bandwidth, then path $p_1$ is the minimum delay path, $p_2$ is the minimum jitter path, and $p_3$ is the maximum bandwidth path.

Next, in step 802, the solution $\underline{\lambda}$ for the set linear equations is determined:

$$c_{\underline{\lambda}}(p_0) = c_{\underline{\lambda}}(p_i); \forall i = 1 \ldots k$$

Once all the $\lambda$ values have been determined, a path r is calculated (step 803) that minimizes a multi-term equation for the modified cost function, $c_{\underline{\lambda}}(r)$, which is defined as follows:

$$c_{\underline{\lambda}}(r) = c(r) + \lambda_1 d_1(r) + \lambda_2 d_2(r) + \lambda_3 d_3(r) \ldots + \lambda_i d_i(r)$$

Having calculated a path r that minimizes the modified cost function for a path r, the modified cost function is determined for the path $p_0$ (step 804). Then it is determined whether $c_{\underline{\lambda}}(p_0) = c_{\underline{\lambda}}(r)$ (step 805). If the modified cost function for path $p_0$ is equal to the modified cost path for path r ("Yes" path out of decision step 805), then the value of $\lambda$ has been determined which maximizes the cost function $L(\underline{\lambda})$. Then $\underline{\lambda}^* = \underline{\lambda}$ and $P^* = p_i$ where path $p_i$ is chosen for which the maximal exceeding of the constraints is minimized (step 806). This is because any or all $p_i$ determined can exceed one or more constraints.

If, however, $c_{\underline{\lambda}}(p_0) \neq c_{\underline{\lambda}}(r)$ ("No" path out of decision step 805), then path $p_i$ is replaced with path r, (i.e. the equation from step 802 now becomes $c_{\underline{\lambda}}(p_0) = c_{\underline{\lambda}}(r)$), for all i (step 807). Each time $p_i$ is replaced with r (for each different i), a new set of $\lambda$'s is calculated (step 807). The path $p_i$ is chosen which, when path r was substituted for it, maximizes the values of:

$$c_\lambda(r) - \sum_{i=1}^{k} \lambda_i D_i$$

As an example, suppose there are three additional constraints, besides cost c: delay $d_1$, jitter $d_2$ and phase shift $d_3$.

We then need four paths (k+1 paths); $p_0, p_1, p_2$ and $p_3$. The equations to find the solution for the modified cost function and $\lambda$ are as follows:

$$c_{\underline{\lambda}}(p_0) = c(p_0) + \lambda_1 d_1(p_0) + \lambda_2 d_2(p_0) + \lambda_3 d_3(p_0) \quad \text{(a)}$$

$$c_{\underline{\lambda}}(p_1) = c(p_1) + \lambda_1 d_1(p_1) + \lambda_2 d_2(p_1) + \lambda_3 d_3(p_1) \quad \text{(b)}$$

$$c_{\underline{\lambda}}(p_2) = c(p_2) + \lambda_1 d_1(p_2) + \lambda_2 d_2(p_2) + \lambda_3 d_3(p_2) \quad \text{(c)}$$

$$c_{\underline{\lambda}}(p_3) = c(p_3) + \lambda_1 d_1(p_3) + \lambda_2 d_2(p_3) + \lambda_3 d_3(p_3) \quad \text{(d)}$$

The following are the equations to solve:

$$c(p_0) + \lambda_1 d_1(p_0) + \lambda_2 d_2(p_0) + \lambda_3 d_3(p_0) = c(p_1) + \lambda_1 d_1(p_1) + \lambda_2 d_2(p_1) + \lambda_3 d_3(p_1) \quad 1.$$

$$c(p_0) + \lambda_1 d_1(p_0) + \lambda_2 d_2(p_0) + \lambda_3 d_3(p_0) = c(p_2) + \lambda_1 d_1(p_2) + \lambda_2 d_2(p_2) + \lambda_3 d_3(p_2) \quad 2.$$

$$c(p_0) + \lambda_1 d_1(p_0) + \lambda_2 d_2(p_0) + \lambda_3 d_3(p_0) = c(p_3) + \lambda_1 d_1(p_3) + \lambda_2 d_2(p_3) + \lambda_3 d_3(p_3) \quad 3.$$

Then, $\lambda_1$, $\lambda_2$ and $\lambda_3$ are calculated.

An improved stop condition can be implemented for the method of FIG. 8. It can be shown that $c_\lambda(r) = L(\underline{\lambda}) \leq L^* \leq c_{\underline{\lambda}}(p_0)$ at each iteration step, so the method can be stopped when these bounds are close enough together, similar to what was shown before, in FIGS. 3A and 3B. The improved stop condition, which can be inserted in the method of FIG.

8 after step 804, determines how far apart $c_\lambda(r)$ and $c_\lambda(p_0)$ are, and saves significant processing resources.

For example, it can be determined to stop the search for a path that satisfies the above described conditions when the two modified cost functions differ by less than 1%. It is understood that the value of 1% is for illustrative purposes only, and that other values can be used, dependent upon the circumstances.

Now that exemplary embodiments of the present invention have been described, a simulation of the present invention versus other path finding techniques will be described in connection with FIGS. 9–14 to highlight the advantageous characteristics of the present invention. The present invention is identified in FIGS. 9–14 with the acronym LARAC which stands for Lagrange Relaxation based Aggregated Cost. The results illustrated in FIGS. 9–14 are based upon a simulation environment of 100 random networks with 40 nodes and an average node degree of 4 (node degree is the number of links connected to a node), which reflects real network values. The cost values on the links varies from 1 to 15 with a uniform distribution and the propagation delay on the links is selected to resemble delay characteristics of a nationwide network in, e.g., the United States. The first range of the propagation delay (1–5 ms) represents short local links, the second range (5–8 ms) represents longer local links, while the third range (20–30 ms) represents continental links. The ratio of long local links was configured to be 20 percent, while the ratio of continental links was configured to be 5 percent. The results of the measurements illustrated in FIGS. 9–14 have been averaged.

Figure 9:
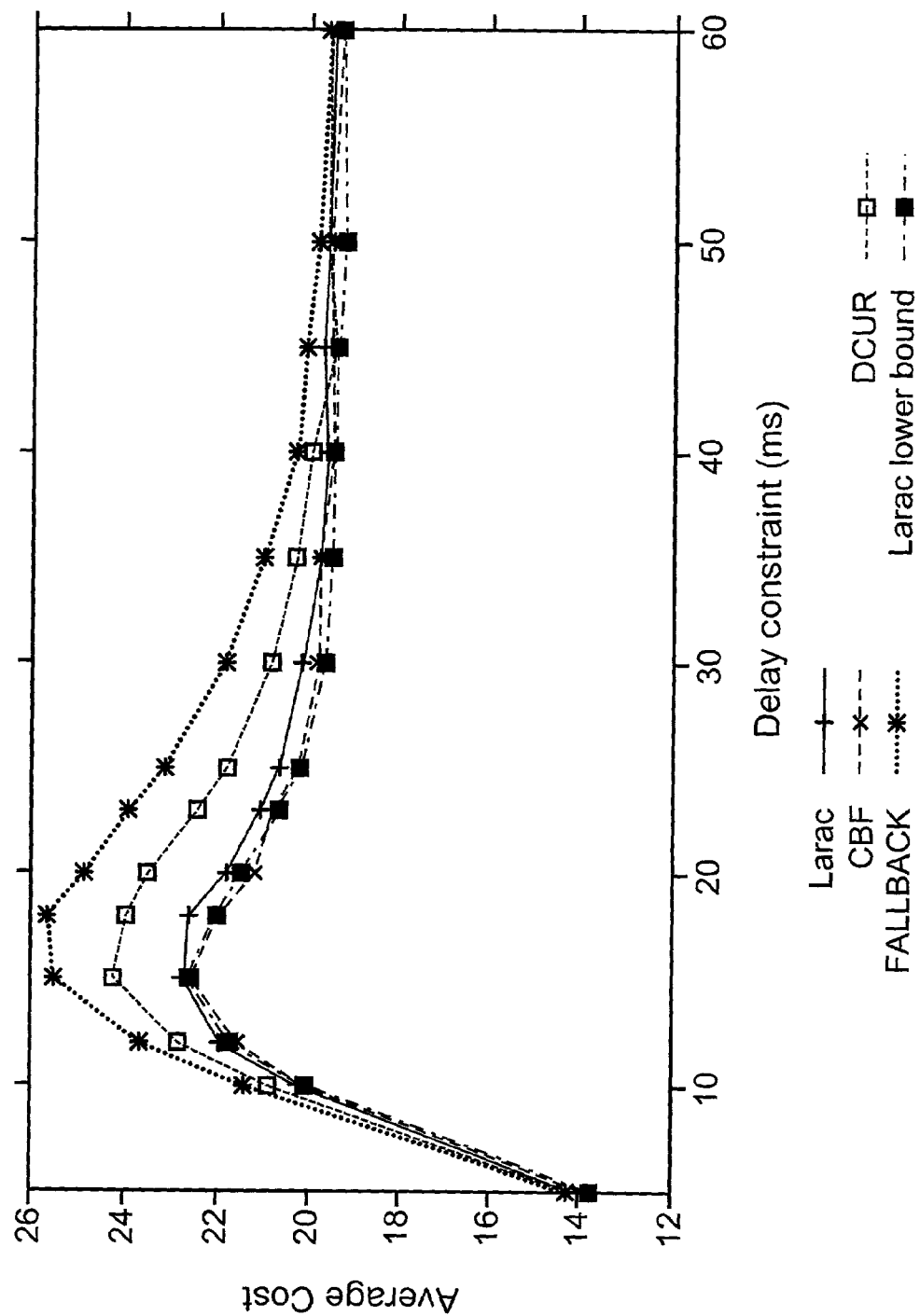
FIG. 9 illustrates a graph which compares the average cost versus delay constraint for the present invention and other path finding algorithms.

FIG. 9 illustrates the average cost for a variety of delay constraints. As illustrated in FIG. 9, all of the algorithms managed to find a path that satisfies the delay constraint. However, in minimizing the other additive metric (i.e., cost) the algorithms produced different results. The present invention found almost the same path as the constrained Bellman-Ford (CBF) routing algorithm, while a Delay Constrained Routing (DCUR) algorithm found paths with higher cost. The worst cost was achieved by the Fallback algorithm. TABLE III below illustrates the maximum worst case cost max $\delta_A$ and the average worst case cost $\overline{\delta_A}$.

TABLE III

| Algorithm | max $\delta_A$ | average $\overline{\delta_A}$ |
| --- | --- | --- |
| Present Invention | 102.9% | 101.3% |
| DCUR | 110.9% | 104.7% |
| Fallback | 117.4% | 108.7% |
| Lower Bound of Present Invention | 99.27% | 99.7% |

From FIG. 9 it can been seen that the first section of the curves (D<15 ms), the found paths have very low cost, and after this delay point the cost of the paths increase with the delay bound. This can be explained by the fact that it is impossible to find a path for all source-destination pairs with a small maximum delay constraint D, and the found paths are short, hence, the costs of them are small. As the delay bound increases, the path-finding algorithms find longer paths and therefore the average cost of the paths increases. After the point where a path can be found for all source-destination pairs, the average cost of the paths will decrease with the delay bound since the algorithms are able to find paths with lower costs and higher delay bounds.

Figure 10:
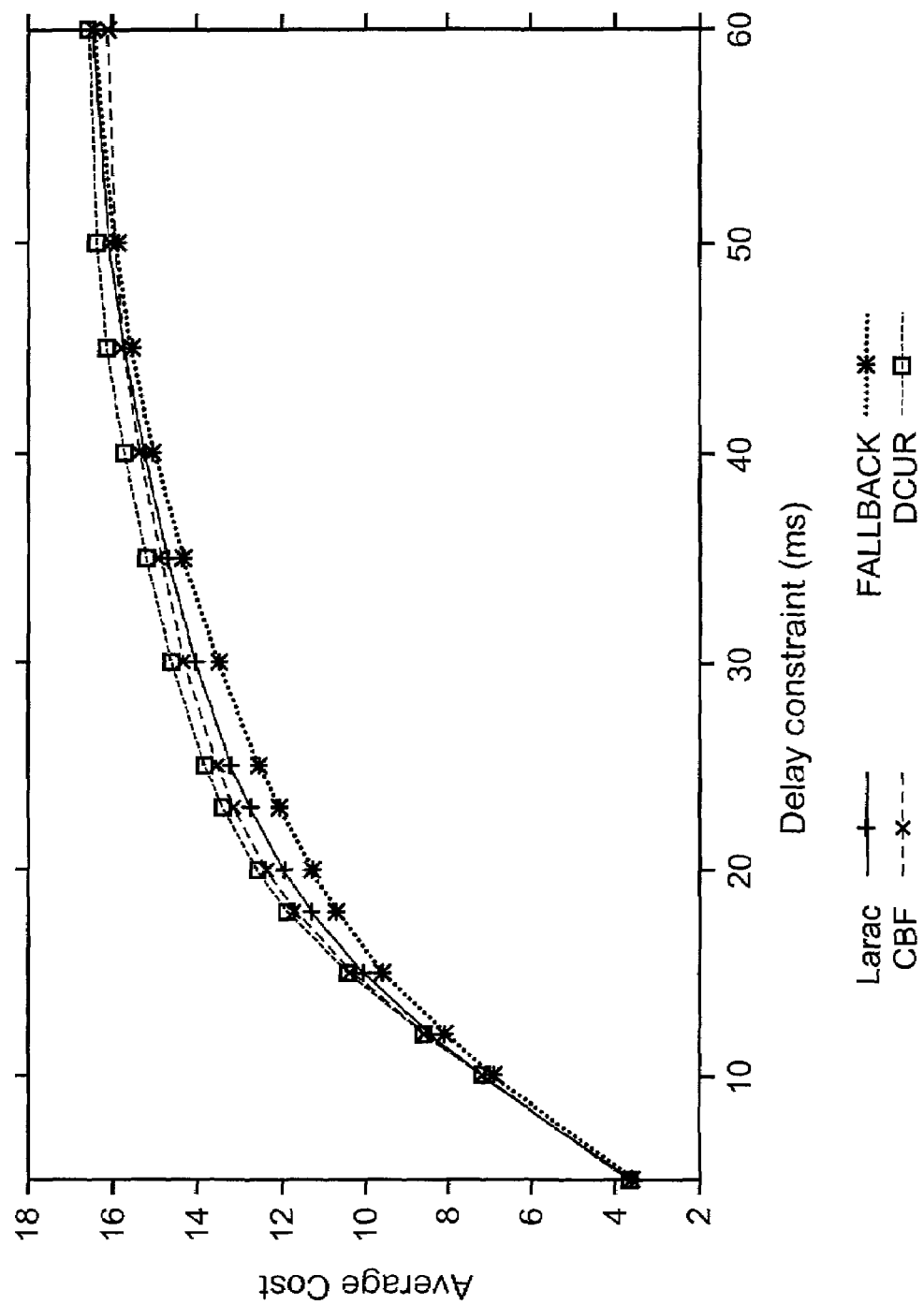
FIG. 10 illustrates a graph which compares the average delay versus delay constraint for the present invention and other path-finding algorithms.

FIG. 10 illustrates the average delay versus the delay constraint for the various path finding algorithms. As illustrated in FIG. 10, the curve of the present invention is very similar to the curves of the CBF, Fallback and DCUR algorithms. However, the present invention has a smaller average delay than all but the Fallback algorithm when the delay constraint falls in the range of approximately 15 ms to 35 ms.

Figure 11:
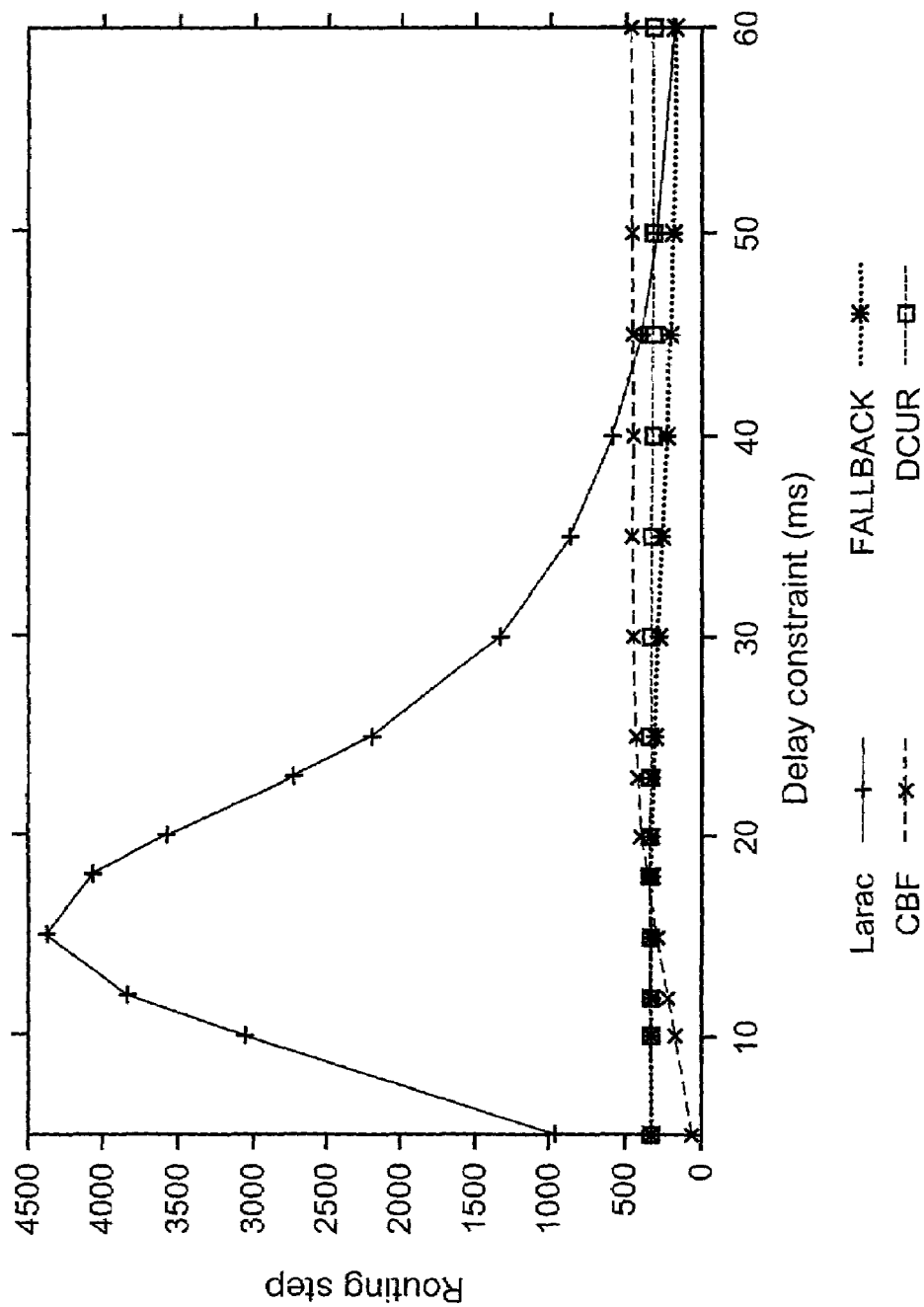
FIG. 11 illustrates a graph which compares the routing steps versus delay constraint for the present invention and other path finding algorithms.

FIG. 11 illustrates the average number of steps of the various algorithms versus the delay constraint. As illustrated in FIG. 11, the present invention has an increasing running time for small delay constraints. This is due to the fact that as the present invention finds more paths to more destinations, the number of Dijkstra executions increases. As the present invention reaches the delay constraint that allows paths to all the nodes in the network, the number of steps starts to decrease since minimum cost paths computed first can more likely satisfy the looser delay bounds, thereby eliminating the execution of the second Dijkstra algorithm to obtain the minimum delay path. This is the reason why the average number of steps for the present invention approximates the number of steps of a single Dijkstra algorithm for high delay values.

As also illustrated in FIG. 11, the Fallback algorithm has a decreasing characteristic as well; the difference is that it is linear in the first section and equals the running time of two Dijkstra algorithms. After this first section, the number of steps decreases to the number of steps of one Dijkstra algorithm for similar reasons to that described above in connection with the present invention. The DCUR algorithm was implemented in a centralized manner for the simulations. Accordingly, the running time of it would be significant, i.e., 2n times the running time of a Dijkstra algorithm. Thus, in FIG. 11 an estimation is plotted for a distributed implementation. The estimation is the running time of two Dijkstra algorithms. The CBF algorithm has a totally different characteristic. Since the algorithm's exit condition depends only on the delay constraint, it increases with the delay constraint. The last horizontal section of the graph illustrates that the algorithm has been stopped because all the paths from the heap have already been used.

Figure 12:
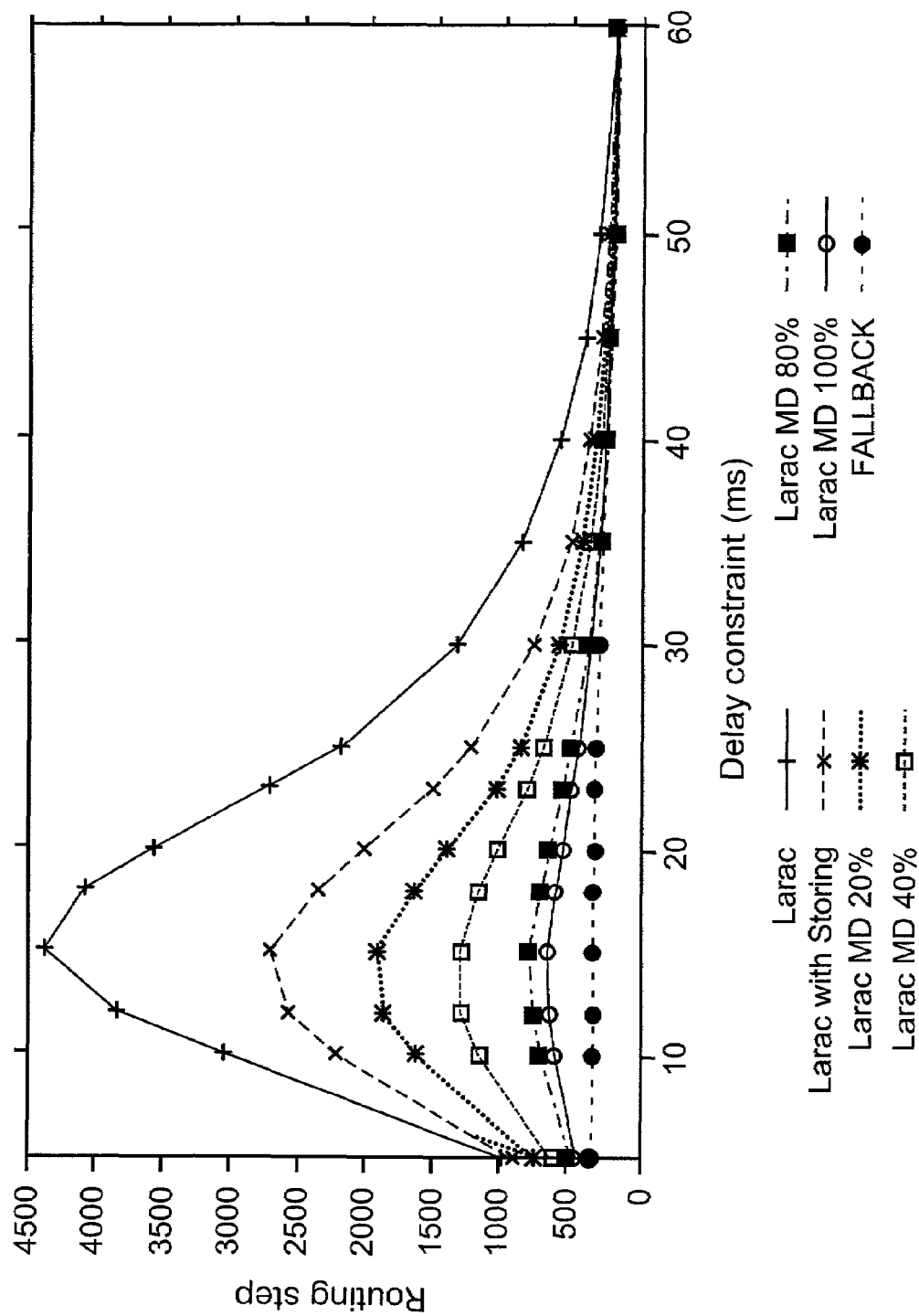
FIG. 12 illustrates a graph which compares the routing steps versus delay constraint for various embodiments of the present invention and other path finding algorithms.
Figure 13:
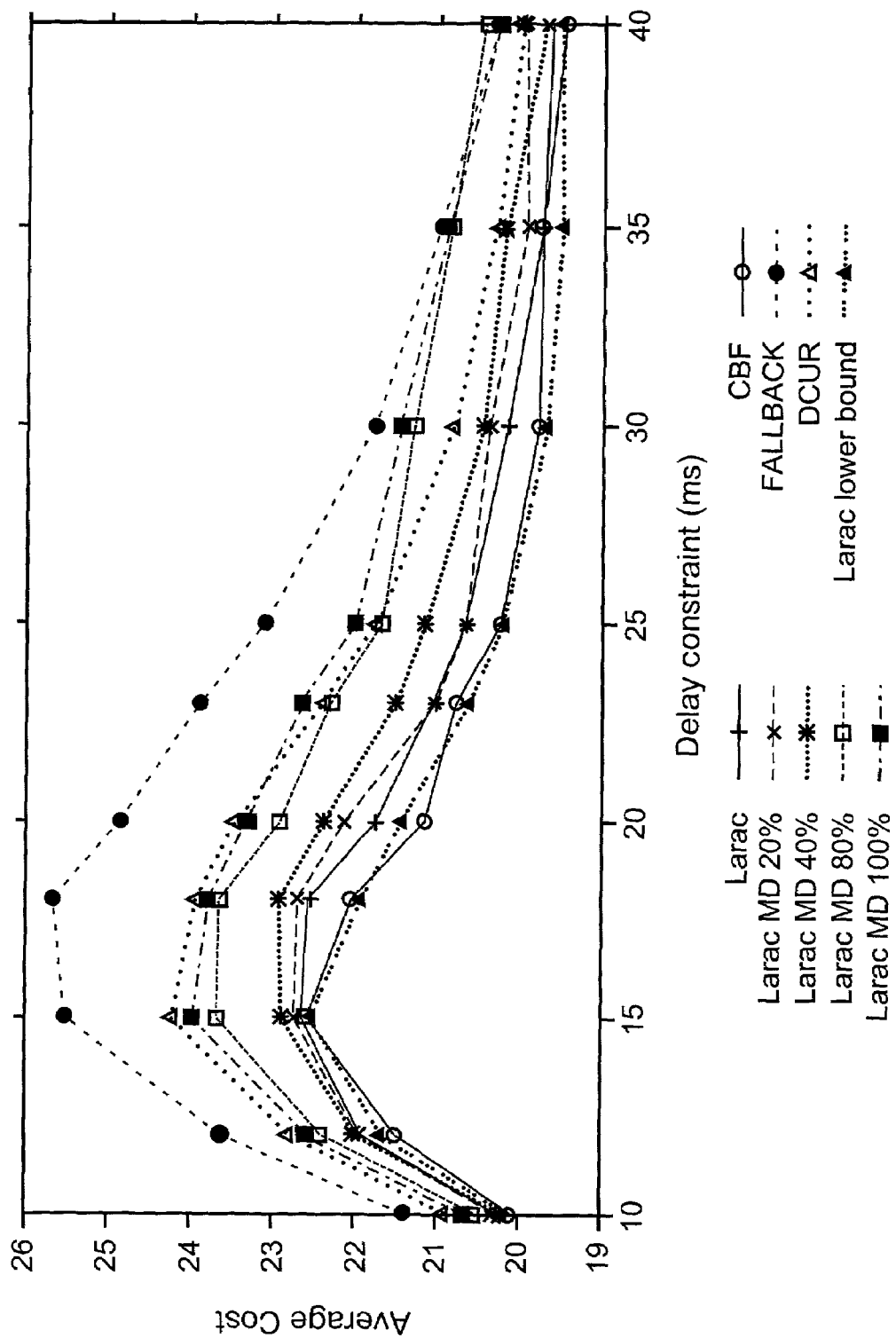
FIG. 13 illustrates a graph which compares the average cost versus delay constraint for various embodiments of the present invention and other path finding algorithms.

FIGS. 12 and 13 illustrate the performance of the present invention, the present invention with the storing step, the present invention with a stop condition of 20%, 40%, 80% and 100%, and the Fallback algorithm. As illustrated in FIG. 12, the gain of the routing steps under the critical delay bound of 15 ms is up to 39%. FIGS. 12 and 13 illustrate the average routing step of the algorithms and the average cost of the computed paths. As can be seen from FIG. 12, the running time greatly decreases as we increase the value of the stop condition (illustrated in FIGS. 12–14 as maximal difference (MD)). TABLE IV below summarizes the improvement of the algorithms' running time with the help of average iteration number.

TABLE IV

| Algorithm | Average Iteration Number | max $\delta_A$ | average $\overline{\delta_A}$ |
| --- | --- | --- | --- |
| Present Invention (unmodified) | 7.94 | 102.9% | 101.3% |
| MD 20% | 5.80 | 104.7% | 101.5% |
| MD 40% | 4.34 | 105.8% | 102.4% |
| MD 80% | 2.92 | 108.4% | 104.6% |
| MD 100% | 2.57 | 110.2% | 105.4% |

As illustrated in TABLE IV, the unmodified present invention had an average iteration number of 7.94, while the present invention with a 40% stop condition the number of iterations decreased to 4.34.

FIG. 13 illustrates the average cost of the path. When the stop condition has a 40% value, the average cost inefficiency increased to 102.4%. Similarly, when the stop condition has a value of 80% the average cost inefficiency equals 104.6%. The gain on running time compared to the loss on the optimality of path costs seems worthy. Moreover, the present invention provides a good way of controlling the trade-off between optimality of the path and the running time of the algorithm.

The embodiments described above are merely given as examples and it should be understood that the invention is not limited thereto. It is of course possible to embody the invention in specific forms other than those described without departing from the spirit of the invention. Further modifications and improvements which retain the basic underlying principles disclosed and claimed herein, are within the spirit and scope of this invention.

What is claimed is:

1. A method for determining a delay constrained least cost path in a multi-path communication system, the method comprising the steps of:
   finding a first path with a minimum cost and first path delay;
   finding a second path with minimum delay and second path cost;
   determining the delay constrained least cost path based, in part, on the first path and second path by using a Lagrange relaxation variable, comprising:
   calculating a Lagrange relaxation variable; and,
   determining the delay constrained least cost path based on the Lagrange relaxation variable;
      wherein the step of calculating a Lagrange relaxation variable comprises:
         calculating a first sum equal to the cost of the first path less the cost of the second path;
         calculating a second sum equal to the delay of the first path less the delay of the second; and,
         dividing the first sum by the second sum.

2. The method of claim 1, wherein the step of determining the delay constrained least cost path based, in part, on the first path and second path, comprises:
   determining that if the first path delay is less than a maximum allowable delay, then the first path is the delay constrained least cost path.

3. The method of claim 1, wherein the step of determining the delay constrained least cost path based, in part, on the first path and second path, comprises:
   determining that if the second path delay is greater than the maximum allowable delay then there is no delay constrained least cost path.

4. The method of claim 1, wherein the step of determining the delay constrained least cost path based on the Lagrange relaxation variable, comprises:
   determining a third path that minimizes a first modified cost function;
   calculating a second modified cost function using the first path;
   determining that the delay constrained least cost path is the second path if the second modified cost function equals the first modified cost function.

5. The method of claim 1, wherein the step of determining the delay constrained least cost path based on the Lagrange relaxation variable, comprises:
   determining a third path that minimizes a first modified cost function;
   calculating a second modified cost function using the first path;
   determining that the first modified cost function does not equal the second modified cost function;
   determining whether the delay of the third path is greater than the maximum allowable delay, and if yes, replacing the first path with the third path to create a new first path, and if not, replacing the second path with the third path, to create a new second path, and
   determining the delay constrained least cost path based on the new first path or new second path.

6. The method of claim 5, wherein the step of determining the delay constrained least cost path based on the new first path or new second path, comprises:
   repeating the steps of:
      calculating a new Lagrange relaxation variable based on the new first path or based on the new second path, wherein the new first path takes the place of the first path, or the new second path takes the place of the second path;
      determining a new third path that minimizes a new first modified cost function, based on the new Lagrange relaxation variable;
      calculating a new second modified cost function using the old first path, or new first path and the new Lagrange relaxation variable; and
      determining whether the new second modified cost function equals the new first modified cost function, and if yes, then the delay constrained least cost path equals either the new second path or second path used in calculating the new second modified cost function, and if not, determining whether the delay of the new third path is greater than or equal to the maximum allowable delay, and if yes, replacing the new first path or first path, with the new third path, and if not, replacing the new second path or second path, with the new third path, until the delay constrained least cost path is determined.

7. The method of claim 1, wherein the step of finding a first path with minimum cost, comprises:
   using a Dijkstra Algorithm.

8. The method of claim 1, wherein the step of finding a second path with minimum delay, comprises:
   using a Dijkstra Algorithm.

9. The method according to claim 4, wherein the step of determining a third path that minimizes a first modified cost function, comprises:
   using a Dijkstra Algorithm.

10. The method of claim 4, wherein the step of determining a third path that minimizes a first modified cost function, comprises:
   defining the modified cost function defined as the cost of the third path plus the product of the Lagrange relaxation variable and the delay of the third path.

11. The method of claim 1, wherein the step of determining the delay constrained least cost path based, in part, on the first path and second path, comprises:
   determining that if the cost of the second path is within a certain percentage of the cost of the first path, the second path is the delay constrained least cost path.

12. A method for determining a delay constrained least cost path, in a multi-path communication system, the method comprising the steps of:
   finding a first path with minimum cost and a first path delay; finding a second path with minimum delay and a second path cost;
   generating a series of Lagrange relaxation variables, each Lagrange relaxation variable having an associated third path, each third path having a delay and cost; and determining the delay constrained least cost path, based on the first path, second path, Lagrange relaxation variable, and third path.

13. The method of claim 12, wherein the step of determining the delay constrained least cost path, based on the first path, second path, Lagrange relaxation variable, and third path, comprises:

selecting a first group of associated third paths, the delays of which are greater than or equal to a maximum allowable delay;

selecting a second group of associated third paths, the delays of which are less than a maximum allowable delay;

determining a primary Lagrange relaxation variable, from the first group of associated third paths, the primary Lagrange relaxation variable being the maximum associated Lagrange relaxation variable, the primary Lagrange relaxation variable having an associated primary third path;

determining a secondary Lagrange relaxation variable, from the second group of associated third paths, the secondary Lagrange relaxation variable being the minimum associated Lagrange relaxation variable, the secondary Lagrange relaxation variable having an associated secondary third path; and selecting the primary third path to be a first path, and selecting the secondary third path to be a second path.

14. A method for determining a least cost path satisfying multiple constraints in a multi-path communication system, the method comprising the steps of:

finding multiple paths, one for each of multiple constraints, each of the multiple paths having a different minimum constraint, a first multiple path being a minimal cost path;

calculating a first set of multiple Lagrange relaxation variables, one for each of the multiple constraints;

determining a minimizing path that minimizes a first multi-term modified cost function;

calculating a second multi-term modified cost function using the first multiple path; and determining the least cost path satisfying multiple constraints.

15. The method of claim 14, wherein the step of determining the least cost path satisfying multiple constraints comprises:

determining that the first multi-term modified cost function equals the second multi-term modified cost function; and determining which of the multiple paths minimizes the maximal exceeding of the constraints, that path being the path satisfying multiple constraints.

16. The method of claim 15, wherein the step of determining which of the multiple paths that minimizes the maximal exceeding of the constraints comprises:

comparing the constraints of the multiple paths, and determining which path has a lowest constraint value for a maximal constraint, that path being the least cost path satisfying multiple constraints.

17. The method of claim 14, wherein the step of determining the least cost path satisfying multiple constraints, comprises:

determining that the first multi-term modified cost function does not equal the second multi-term modified cost function;

calculating multiple sets of multiple Lagrange relaxation variables, each set corresponding to a particular path of multiple paths; and determining which of the multiple sets of multiple Lagrange relaxation variables is a maximum set of Lagrange relaxation variables, and the particular path of the multiple paths associated with that maximum set of multiple Lagrange relaxation variables, is the least cost path satisfying multiple constraints.

* * * * *

UNITED STATES PATENT AND TRADEMARK OFFICE
CERTIFICATE OF CORRECTION

PATENT NO. : 7,020,086 B2 Page 1 of 1
APPLICATION NO. : 09/893960
DATED : March 28, 2006
INVENTOR(S) : Juttner et al.

It is certified that error appears in the above-identified patent and that said Letters Patent is hereby corrected as shown below:

In Column 1, Line 37, delete "modem" and insert -- modern --, therefor.

In Column 8, Line 2, delete "lengthcostcost" and insert -- length cost --, therefor.

In Column 9, Line 46, delete "$c_{80}$" and insert -- $c_\gamma$ --,

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,020,086 B2
APPLICATION NO. : 09/893960
DATED : March 28, 2006
INVENTOR(S) : Juttner et al.

It is certified that error appears in the above-identified patent and that said Letters Patent is hereby corrected as shown below:

In Column 1, Line 37, delete "modem" and insert -- modern --, therefor.

In Column 8, Line 2, delete "lengthcostcost" and insert -- length cost --, therefor.

In Column 9, Line 46, delete "$c_{80}$" and insert -- $c_\gamma$ --, therefor.

Signed and Sealed this

First Day of January, 2008

JON W. DUDAS
*Director of the United States Patent and Trademark Office*